United States Patent
Kunitake et al.

(10) Patent No.: US 6,811,578 B2
(45) Date of Patent: Nov. 2, 2004

(54) FUEL REFORMING APPARATUS AND METHOD OF CONTROLLING SAME

(75) Inventors: Kazuhisa Kunitake, Susono (JP); Satoshi Iguchi, Mishima (JP); Satoshi Aoyama, Susono (JP); Hiroyuki Usami, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/976,111

(22) Filed: Oct. 15, 2001

(65) Prior Publication Data

US 2002/0046889 A1 Apr. 25, 2002

(30) Foreign Application Priority Data

Oct. 24, 2000 (JP) ......................................... 2000-323656

(51) Int. Cl.[7] .................................................. B01J 8/02
(52) U.S. Cl. .................... 48/127.9; 48/63; 48/198.1; 48/215; 48/198.7; 48/214 A; 48/214 R; 422/105; 422/107; 422/108; 422/110; 422/111; 422/211; 422/212; 422/223; 502/20; 502/34; 502/56
(58) Field of Search ...................... 48/61, 62 R, 63, 48/127.9, 197 R, 198.1, 198.7, 214 R, 215, 214 A; 422/105, 107, 108, 110, 111, 211, 212, 223; 502/20, 34, 56

(56) References Cited

U.S. PATENT DOCUMENTS

| | | | |
|---|---|---|---|
| 3,515,514 A | | 6/1970 | Holmes et al. |
| 4,026,823 A | * | 5/1977 | Van Hook et al. .......... 502/337 |
| 4,855,267 A | | 8/1989 | Cheng |
| 6,432,378 B1 | | 8/2002 | Autenrieth et al. |

FOREIGN PATENT DOCUMENTS

| | | |
|---|---|---|
| DE | 1 246 688 | 2/1968 |
| DE | 197 25 007 C1 | 3/1999 |
| JP | 4-200640 | 7/1992 |
| JP | A 11-79703 | 3/1999 |

* cited by examiner

Primary Examiner—Jerry D. Johnson
Assistant Examiner—Basia Ridley
(74) Attorney, Agent, or Firm—Oliff & Berridge, PLC

(57) ABSTRACT

In a fuel reforming apparatus having a reformer for reforming a raw fuel containing a hydrocarbon-containing compound so as to produce a hydrogen-rich fuel gas for use in a fuel cell, a carbon removal process for removing carbon deposited on a reforming catalyst contained in the reformer is executed by controlling the amount of the raw fuel supplied to the reformer and the amount of the oxygen supplied to the reformer so that a ratio of the number of oxygen atoms O supplied to the reformer to the number of carbon atoms supplied to the reformer becomes larger than an appropriate range of the O/C ratio that is to be established during a normal operation of the reformer.

6 Claims, 16 Drawing Sheets

CARBON REMOVAL MODE OPERATION
(FIRST EXAMPLE)

RELATIONSHIP BETWEEN CARBON REMOVAL PERIOD Δt AND O/C RATIO

RELATIONSHIP BETWEEN CATALYST TEMPERATURE Tcat AND O/C RATIO

PREDICTED VALUES OF
DEPOSITED CARBON AMOUNT Cdep PER UNIT TIME

INTEGRATED AMOUNT OF DEPOSITED CARBON $\Sigma$ Cdep
AND NUMBER OF EXECUTION "N" OF CARBON REMOVAL PROCESS

CARBON REMOVAL MODE OPERATION (SECOND EXAMPLE)

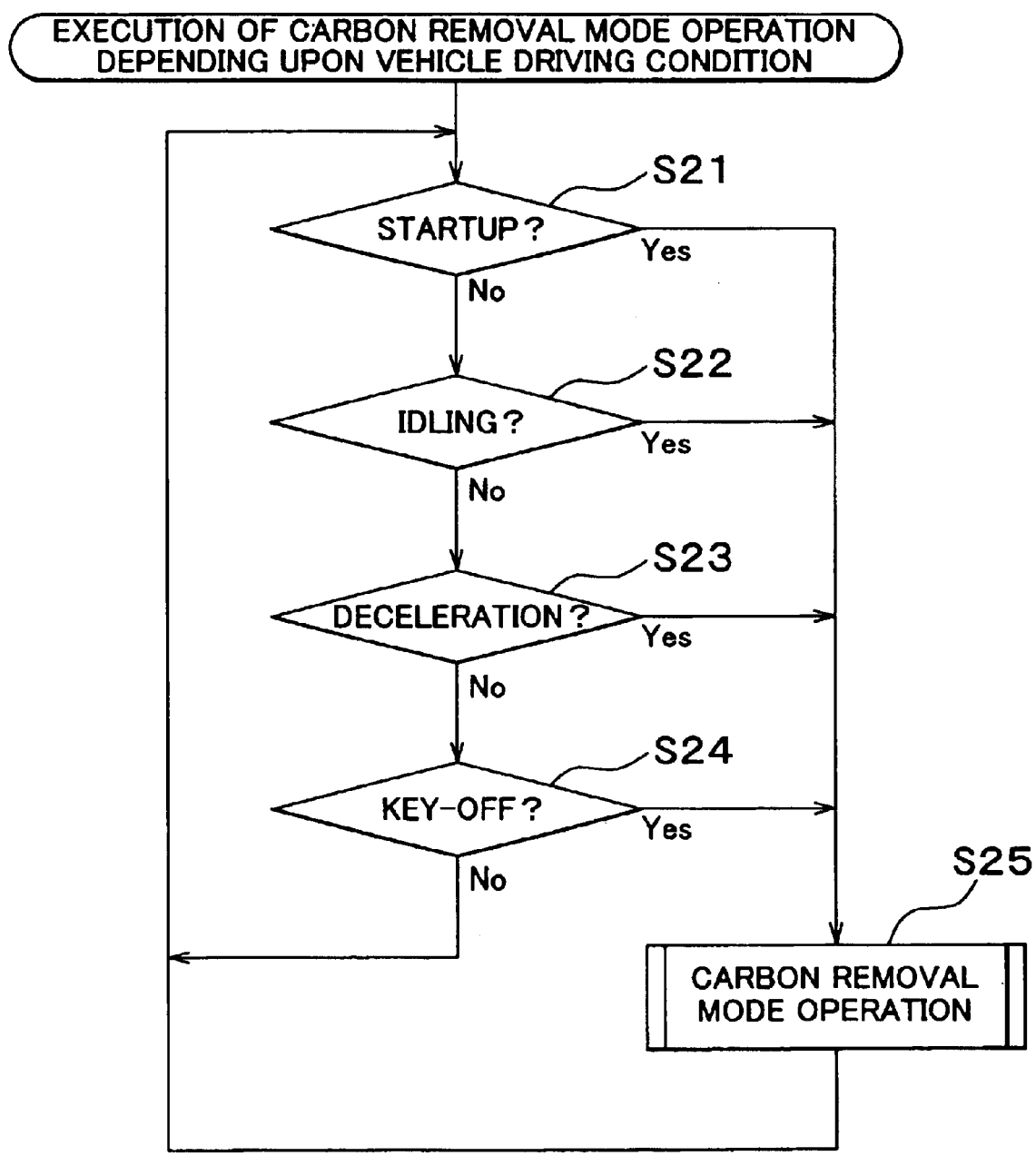

CARBON REMOVAL MODE OPERATION FOR STARTUP CONDITION (FOURTH EXAMPLE)

CARBON REMOVAL MODE OPERATION FOR KEY-OFF CONDITION (FOURTH EMBODIMENT)

CARBON REMOVAL PROCESS IN STRONG MODE (FIFTH METHOD)

FUEL REFORMING APPARATUS AND METHOD OF CONTROLLING SAME

BACKGROUND OF THE INVENTION

1. Field of the Invention

The invention relates to a fuel reforming apparatus that produces a hydrogen-rich fuel gas from a raw fuel containing a hydrocarbon-containing compound, and to a technique for controlling the operation of the fuel reforming apparatus so as to remove carbon deposited in a reformer of the fuel reforming apparatus.

2. Description of Related Art

A known fuel reforming apparatus utilizes a steam-reforming reaction so as to generate a hydrogen-rich fuel gas from a raw fuel containing a hydrocarbon-containing compound(s). Since the steam reforming reaction is an endothermic reaction, the fuel reforming apparatus also utilizes a partial-oxidation reaction of the raw fuel, which is an exothermic reaction, as well as the steam reforming reaction. Thus, heat required for the steam reforming reaction is well balanced with heat generated through the exothermic partial-oxidation reaction. In operation, the amounts of the raw fuel, water and oxygen (air) to be supplied to the fuel reforming apparatus are optimally controlled in view of the balance between the steam reforming reaction and the partial-oxidation reaction. A known example of this type of fuel reforming apparatus is disclosed in Japanese Patent Laid-Open Publication No. 11-79703.

However, the known fuel reforming apparatus suffers from a problem that carbon produced through decomposition of the raw fuel is deposited and accumulated on a reforming catalyst, resulting in deterioration of the activity of the reforming catalyst. In particular, this problem of carbon deposition is significant or serious in the case where a raw fuel containing a higher hydrocarbon compound, such as gasoline, as a major component is used. Therefore, a technique for reducing an amount of carbon deposited and accumulated on the reforming catalyst has been desired.

SUMMARY OF THE INVENTION

It is an object of the invention to provide a fuel reforming apparatus capable of reducing an amount of carbon deposited and accumulated on a reforming catalyst thereof. It is another object of the invention to provide a method of controlling the fuel reforming apparatus so that the amount of carbon deposited and accumulated on the reforming catalyst can be reduced.

To accomplish the above and/or other object(s), there is provided according to one aspect of the invention a fuel reforming apparatus for reforming a raw fuel containing a hydrocarbon-containing compound so as to produce a hydrogen-rich fuel gas for use in a fuel cell. The fuel reforming apparatus includes (a) a reformer including a reforming catalyst, the reformer reforming the raw fuel by utilizing at least a steam reforming reaction and a partial oxidation reaction, (b) a raw fuel supply device that supplies the reformer with the raw fuel, (c) a water supply device that supplies the reformer with water so that at least a part of the supplied water is used for the steam reforming reaction, (d) an oxygen supply device that supplies the reformer with oxygen so that at least a part of the supplied oxygen is used for the partial oxidation reaction of the raw fuel at the reforming catalyst, and (e) a controller that controls the raw fuel supply device, the water supply device and the oxygen supply device. In the fuel reforming apparatus, the controller executes a carbon removal process for removing carbon deposited on the reforming catalyst under a predetermined condition, by controlling at least one of an amount of the raw fuel supplied to the reformer and an amount of the oxygen supplied to the reformer so that an O/C ratio of the number of oxygen atoms O supplied from the oxygen supply device to the number of carbon atoms contained in the raw fuel supplied from the raw fuel supply device becomes larger than an appropriate range of the O/C ratio that is to be established during a normal operation of the reformer.

In the fuel reforming apparatus as described above, the carbon removal process is executed so that the O/C ratio of the number of oxygen atoms O supplied to the reformer to the number of carbon atoms supplied to the reformer becomes larger than an appropriate range of the O/C ratio that is to be established during the normal operation of the reformer. Thus, the carbon accumulated on the reforming catalyst can be burned, resulting in a reduction in the amount of carbon deposited and accumulated on the reforming catalyst.

In one preferred embodiment of the invention, the controller intermittently executes the carbon removal process a plurality of times.

If the carbon removal process is continuously performed for a long time, the temperature of the reforming catalyst may be gradually increased. If the carbon removal process is finished, on the other hand, the temperature of the reforming catalyst is rapidly lowered. Accordingly, if the carbon removal process is intermittently executed a plurality of times, the amount of carbon accumulated on the reforming catalyst can be reduced while preventing undesirable heating of the reforming catalyst.

In the meantime, the present invention can be realized in various forms. For example, the invention may be realized or embodied in the form of a fuel reforming apparatus, a method of controlling the fuel reforming apparatus, a fuel cell system, a method of controlling the fuel cell system, a moving object having such a fuel reforming apparatus or fuel cell system, a method of controlling the moving object, a computer program that realizes any of these methods or functions of the apparatus or system, a recording medium that stores such a computer program, and a code or data signal which represents such a computer program and takes the form of a transmission wave.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 13 is a flowchart showing an example of a control routine for determining the timing of execution of the carbon removal mode operation according to a fourth example of a control method;

DETAILED DESCRIPTION OF PREFERRED EMBODIMENTS

Figure 1:
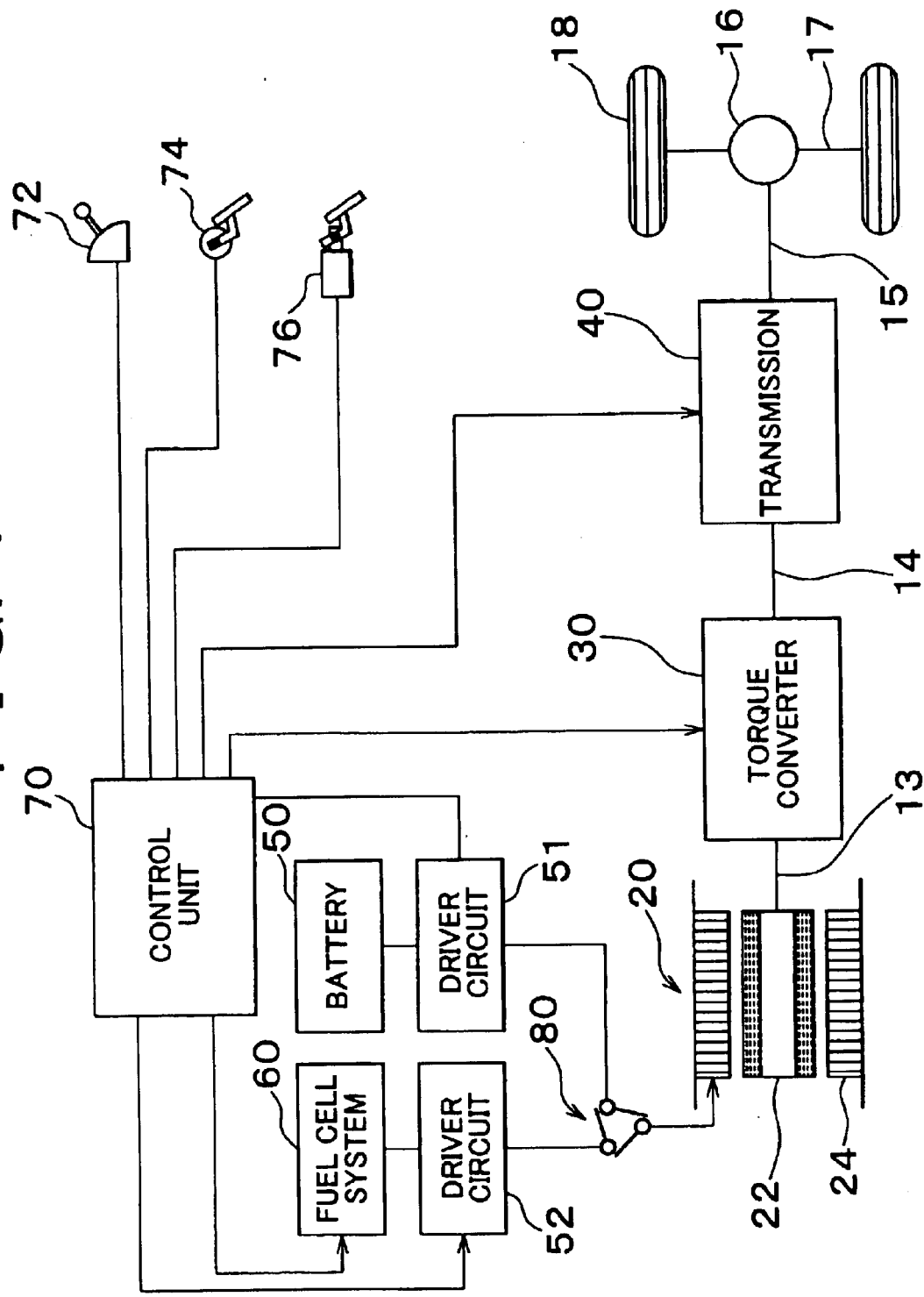
FIG. 1 is a schematic diagram showing the construction of an electric vehicle equipped with a fuel reforming apparatus according to a preferred embodiment of the invention.

FIG. 1 schematically shows the construction of an electric vehicle provided with a fuel reforming apparatus according to a preferred embodiment of the invention. The electric vehicle (hereinafter simply referred to as "vehicle") has a wheel driving mechanism including a motor 20, a torque converter 30 and a transmission 40. The motor 20 has a rotary shaft 13 connected to the torque converter 30, and the torque converter 30 has an output shaft 14 connected to the transmission 40. The transmission 40 has an output shaft 15 connected to an axle 17 of wheels 18 via a differential gear 16.

The motor 20 is a three-phase synchronous motor including a rotor 22 and a stator 24. A plurality of permanent magnets are disposed on the outer circumferential surface of the rotor 22. A three-phase coil is wound around the stator 24 so as to form magnetic fields for rotation. The motor 20 is driven or rotated by interactions between magnetic fields generated by the permanent magnets disposed on the rotor 22 and the magnetic fields formed by the three-phase coil of the stator 24. When the rotor 22 is rotated by external force applied thereto, the motor 20 generates an electromotive force at opposite ends of the three-phase coil, utilizing the interactions between the above-mentioned magnetic fields. In this case, the motor 20 functions as a generator.

The motor 20 is equipped with two power supplies, namely, a fuel cell system 60 as a primary power supply and a battery 50 as an auxiliary power supply. The battery 50 functions to supply supplementary electric power to the motor 20, when the fuel cell system 60 fails, or when the fuel cell system 60 is not able to generate a sufficient amount of electric power to the motor 20 upon a start of the vehicle. The battery 50 also functions to supply electric power to an electronic control unit 70 for performing control of the vehicle, and to other electric components (not shown), such as an illumination system, installed on the vehicle.

The electric power generated by the two power supplies 50, 60 is supplied to the motor 20 via respective driver circuits 51, 52 and a transfer switch 80. The transfer switch 80 is able to change connecting states among the battery 50, the fuel cell system 60 and the motor 20 as desired. Described in detail, the stator 24 is electrically connectable to the battery 50 via the transfer switch 80 and the first driver circuit 51, and is electrically connectable to the fuel cell system 60 via the transfer switch 80 and the second driver circuit 52. Each of the first and second driver circuit 51, 52 consists of a transistor inverter, which includes a plurality of transistors that provide a pair of source-side and sink-side transistors for each of the three phases of the motor 20. The first and second driver circuit 51, 52 are also electrically connected to the control unit 70.

The control unit 70 performs various control operations on the vehicle, on the basis of vehicle-operator's instructions or commands received from a shift lever 72, an accelerator pedal 74 and a brake pedal 76. The control unit 70 executes pulse width modulation (PWM) control for controlling an ON/OFF time of each of the transistors of the driver circuits 51, 52. As a result, pseudo three-phase alternating current is applied from the battery 50 and the fuel cell system 60 as power supplies to the three-phase coil of the stator 24, thereby forming magnetic fields for rotation of the motor 20. With the magnetic fields thus formed, the motor 20 function as an electric motor or a generator as described above.

Figure 2:
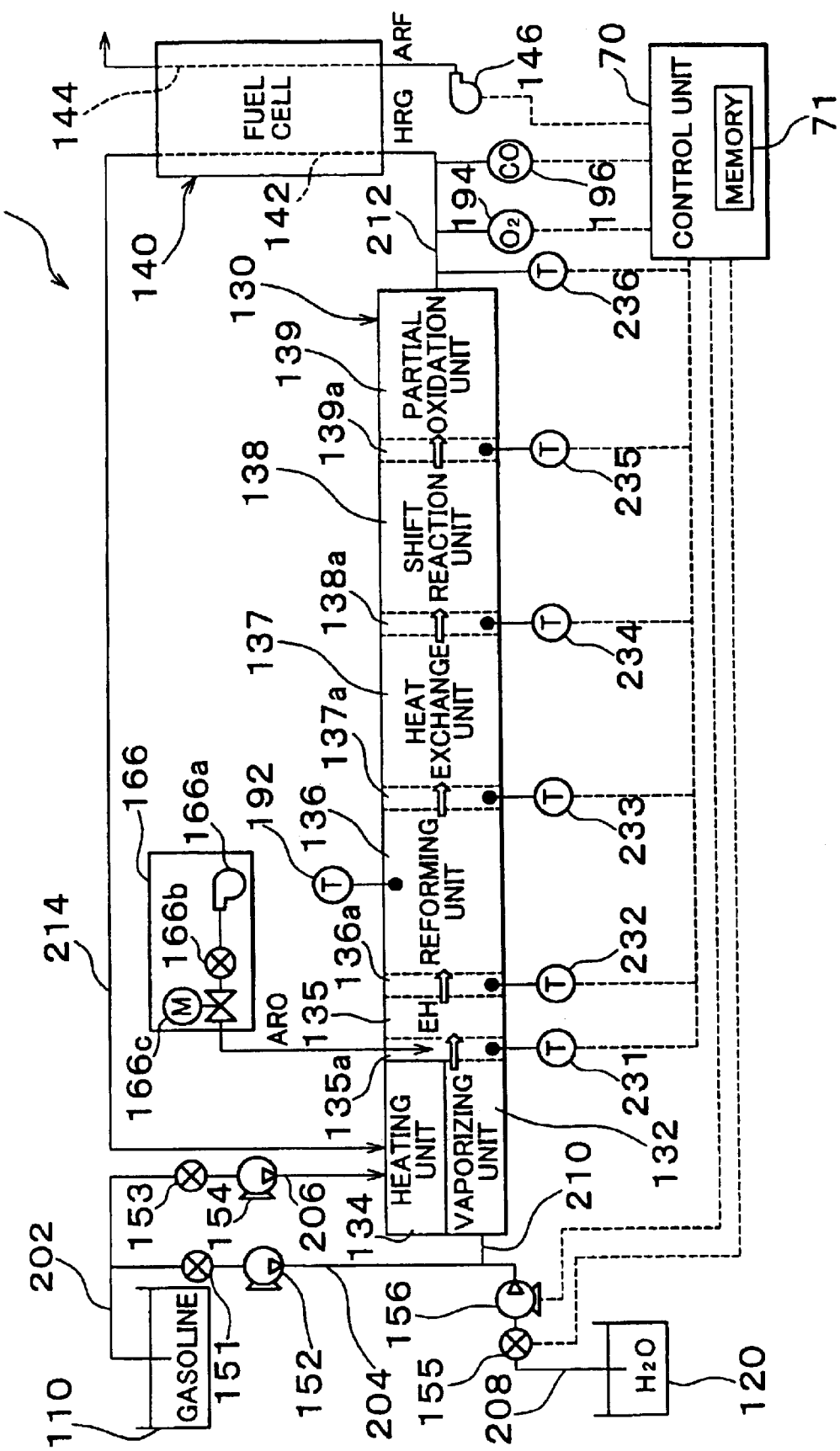
FIG. 2 is a schematic diagram illustrating the structure of a fuel cell system of the fuel reforming apparatus of FIG. 1.

The control unit 70 performs the various control operations by executing various control programs stored in a memory 71 (as shown in FIG. 2) that is incorporated in the control unit 70. The memory 71 may be provided by a selected one of various types of storage media, such as a read only memory (ROM) and a hard disk.

FIG. 2 shows the construction of the fuel cell system 60. The fuel cell system 60 includes a fuel tank 110 for storing a raw fuel such as gasoline, a water tank 120 for storing water, and a reformer 130 for producing a fuel gas (or a reformate gas) by reforming the raw fuel, and a fuel cell 140. The reformer 130 includes a vaporizing unit 132 for vaporizing or gasifying the raw fuel, a catalytic heating unit 134 for supplying heat to the vaporizing unit 132, an electric heating unit (EH) 135, and a reforming unit 136 that houses a reforming catalyst. The reformer 130 further includes a heat exchange unit 137 for cooling the reformate gas, a shift reaction unit 138 for reducing a content of carbon monoxide in the reformate gas by utilizing a shift reaction, and a partial-oxidation unit 139 for reducing a content of carbon monoxide in the reformate gas by utilizing a partial-oxidation reaction.

A fuel supply passage 202 is connected to the raw fuel tank 110, while a water supply passage 208 is connected to the water tank 120. The fuel supply passage 202 diverges into two passages, namely, a first by-pass passage 204 and a second by-pass passage 206. The first by-pass passage 204 and the water supply passage 208 join together to form a first fuel supply passage 210 that is connected to the vaporizing unit 132. On the other hand, the second by-pass passage 206 is connected to the catalytic heating unit 134. The first by-pass passage 204 is provided with a flowmeter 151 and a pump 152, while the second by-pass passage 206 is provided with a flowmeter 153 and a pump 154. Likewise, the water supply passage 208 is provided with a flowmeter 155 and a pump 156.

A suitable amount of gasoline drawn by the pump 152 and a suitable amount of water drawn by the pump 156 are mixed together, and are then fed to the vaporizing unit 132. Hereinafter, the mixture of the gasoline and water will be referred to as "material to be reformed" or "pre-reformed material". The pre-reformed material is vaporized in the vaporizing unit 132, to form a pre-reformed gas containing gasoline vapor and steam. The pre-reformed gas is heated in the electric heating unit 135 as needed, and is then fed to the reforming unit 136. The pre-reformed gas is converted into a hydrogen-rich fuel gas (HRG) through chemical reactions that occur in the reforming unit 136, the shift reaction unit 138 and the partial-oxidation unit 139.

The fuel gas HRG thus produced in the reformer 130 is fed to a fuel gas passage 142 formed through the fuel cell 140, through a fuel gas passage 212. The fuel cell 140 is further provided with an air passage 144 to which the air (ARF) is fed by means of the air pump 146. For example, a blower may be used as the air pump 146. The fuel cell 140 generates electric power through an electrochemical reaction between hydrogen contained in the fuel gas HRG and oxygen contained in the air ARF, whereby the hydrogen contained in the fuel gas HRG is consumed.

An exhaust fuel gas discharged from the fuel cell 140 is returned or re-introduced into the catalytic heating unit 134 through a discharge passage 214 that communicates the fuel gas passage 142 with the catalytic heating unit 134. The catalytic heating unit 134 is adapted to burn hydrogen contained in the exhaust fuel gas, and heat the vaporizing unit 132 by utilizing heat generated by the combustion of hydrogen. For example, the catalytic heating unit 134 may be provided by a device that uses a noble metal catalyst, such as a platinum catalyst or a palladium catalyst, for promoting combustion reactions of the exhaust fuel gas or gasoline. In the vaporizing unit 132, the material to be reformed is vaporized by heat given by the catalytic heating unit 134. When an amount of heat generated by the combustion of the exhaust fuel gas is not large enough to vaporize the pre-reformed material in the vaporizing unit 132, a supplemental amount of gasoline as the raw fuel is fed from the fuel tank 110 to the catalytic heating unit 134 through the pump 154.

A mixing chamber 135*a* is disposed upstream of the electric heating unit 135. An air supply device 166 is provided for supplying the mixing chamber 135*a* with the air ARO. The air supply device 166 includes an air pump 166*a*, a flowmeter 166*b*, and an electrically operated valve 166*c*. The electric heating unit 135 is operable to heat the air ARO and the pre-reformed gas (i.e., the mixture of gasoline vapor and steam), to a sufficiently high temperature suitable for the reactions in the reforming unit 136.

In the present embodiment, the raw fuel tank 110, the flowmeter 151 and the pump 152 constitute a raw fuel supply unit of the fuel reforming apparatus. The water tank 120, the flowmeter 155 and the pump 156 constitute a water supply unit of the fuel reforming apparatus. Further, the air supply device 166 corresponds to an oxygen supply unit of the fuel reforming apparatus. In general, a system or device capable of supplying an oxidizing chemical substance, such as oxygen, may be used as the oxygen supply unit.

The fuel cell system further includes a plurality of air supply units (not shown) which are similar to the air supply device 166. These air supply units are operable to supply air (i.e., oxygen) to the catalytic heating unit 134, and to mixing chambers 138*a*, 139*a* respectively disposed upstream of the shift reaction unit 138 and the partial-oxidation unit 139.

The reforming unit 136 is provided with a temperature sensor 192 for measuring a temperature of the reforming catalyst. Likewise, the mixing chambers 135*a*–139*a* disposed upstream of the respective units 135–139 within the reformer 130 are provided with temperature sensors 231–235, respectively.

Moreover, the fuel gas supply passage 212 connecting the reformer 130 with the fuel cell 140 is provided with a temperature sensor 236, an oxygen concentration sensor 194, and a carbon monoxide concentration sensor 196. The control unit 70 receives, as control inputs, measurement values obtained by various sensors including the above-indicated sensors 231–236, 194, 196. The control unit 70 then performs control of the fuel cell system 60 based on the input information. Thus, the control unit 70 controls operation of the fuel cell system 60 on the basis of the control signals received from these sensors 231–236, 194, 196. FIG. 2 shows only connections of the control unit 70 with only a part of components (such as sensors and pumps) that constitute the fuel reforming apparatus, for the sake of simplicity of illustration.

In the fuel reforming apparatus of the present embodiment, a steam reforming reaction and a partial oxidation reaction mainly occur in the reforming unit 136. In the steam reforming reaction, hydrocarbon-containing compound(s) contained in the raw fuel (gasoline) and steam react with each other to mainly produce a hydrogen gas and carbon dioxide. Since the steam reforming reaction is an endothermic reaction, a partial oxidation reaction as one type of an exothermic reaction is utilized for balancing heat required for the steam reforming reaction with heat generated by the partial-oxidation reaction in the reforming unit 136. Here, the term "partial-oxidation reaction" means an oxidizing reaction in which at least a part of carbon contained in the raw fuel is oxidized only to produce carbon monoxide. The air ARO supplied to the mixing chamber 135*a*, which is disposed upstream of the electric heating unit 135, is used for this partial-oxidation reaction.

In the reforming reaction of the hydrocarbon-containing compound, carbon produced during decomposition of the raw fuel is likely to be deposited on the reforming catalyst, resulting in a reduced or deteriorated activity of the reforming catalyst. In particular, the use of a raw fuel, such as gasoline, containing a higher hydrocarbon compound as a major component is likely to result in an increase in the amount of deposition of carbon. Here, the term "higher hydrocarbon compound" means a hydrocarbon-containing compound having four or more carbon atoms. In various control methods which will be described later, the amount of carbon deposited and accumulated on the reforming catalyst is effectively reduced by suitably controlling the amounts of the raw fuel, water and oxygen that are fed to the reformer 130.

The reforming catalyst incorporated in the reforming unit 136 is preferably selected from those which produce a less amount of soot. For example, a noble metal catalyst, a nickel catalyst, a cobalt catalyst, a perovskite catalyst, or a hexa aluminate catalyst may be used as the catalyst. A catalyst carrier or substrate that supports the catalyst may be formed of a ceramic material, such as alumina, zirconia, or titania.

First Example of Control Method

Figure 3A:
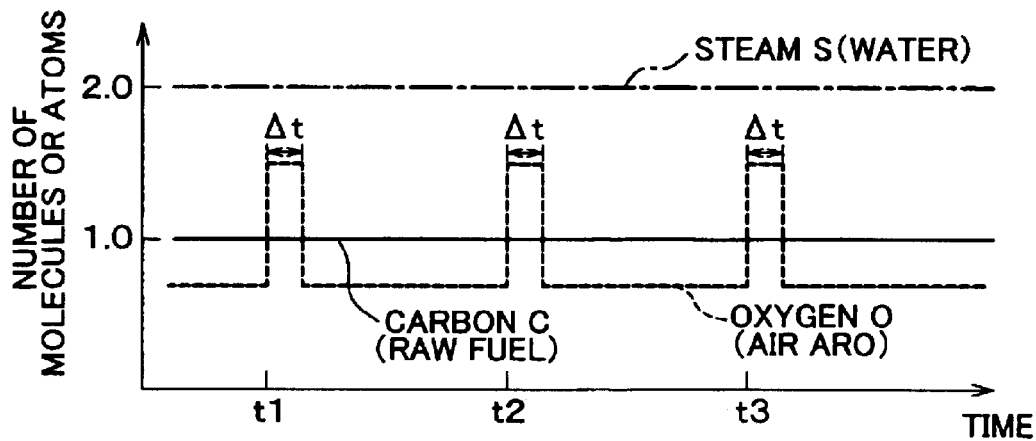
FIGS. 3A–3C are graphs useful for explaining the manner of operating the fuel cell system of FIG. 2 in a carbon removal mode according to a first example of control method.
Figure 3B:
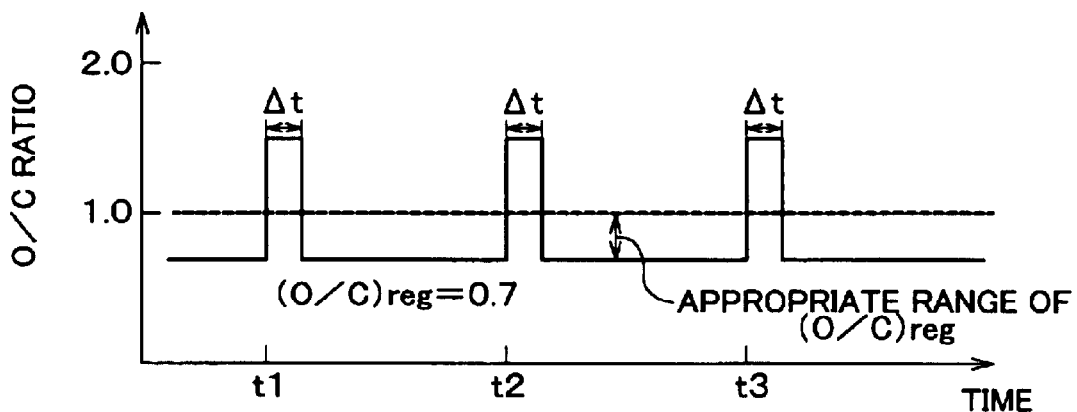
Figure 3C:
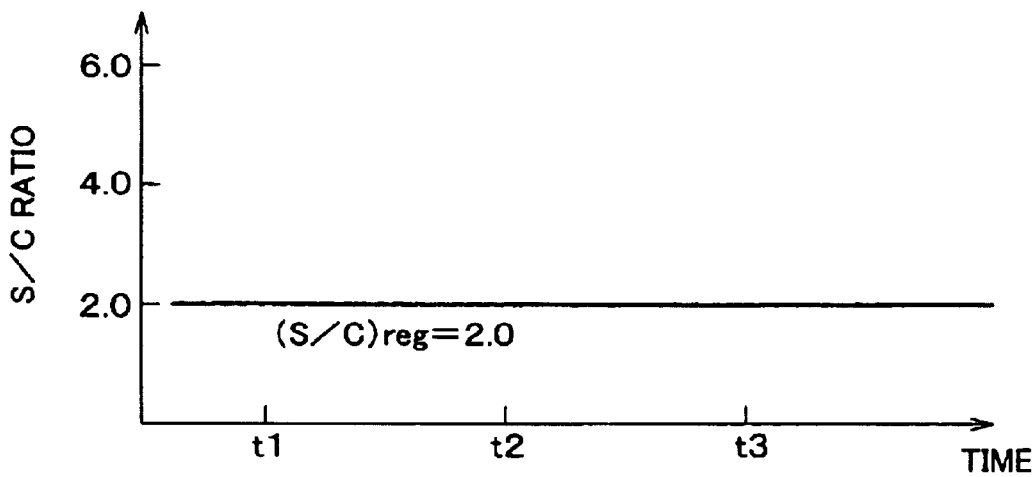

FIGS. 3A–3C shows a manner of operating the fuel cell system 60 (including the fuel reforming apparatus of the above-described embodiment) in a carbon removal mode, according to a first example of control method. FIG. 3A is a graphical representation of time variations of the number of steam molecules S (i.e., the number of moles of the steam molecules), the number of carbon atoms C, and the number of oxygen atoms O, which are supplied to the reforming unit 136 when the fuel cell system 60 operates in a carbon removal mode. These values S, C, O are respectively calculated on the basis of the amounts of flow of water, gasoline and air, which amounts are measured by the respective flowmeters 155, 151, 166*b* (see FIG. 2). FIG. 3B is a graphical representation of a time variation of a ratio of the number of oxygen atoms O to the number of carbon atoms C (hereinafter referred to as a "O/C ratio"). FIG. 3C is a graphical representation of a time variation of a ratio of the number of steam molecules to the number of carbon atoms (hereinafter referred to as a "S/C" ratio).

In this example, it is assumed that the fuel cell system 60 operates in a steady or constant operating mode until time reaches t1 in FIGS. 3A–3C. In the steady operating mode, the amounts of water, raw fuel, and air ARO, which are supplied to the reforming unit 136, are kept constant. Described in detail, the O/C ratio in this steady operating mode is equal to about 0.7, and the S/C ratio in the same mode is equal to about 2.0. As is understood from FIG. 3B, a proper or appropriate value of the O/C ratio (O/C reg.) in the steady operating mode is held within a range of about 0.7 to about 1.0. The appropriate value of the O/C ratio (O/C reg.) may vary depending upon the load of the fuel cell 140. However, an actual O/C ratio does not exceed the appropriate value of the O/C ratio (O/C reg.) while the fuel cell system 60 is operating in the steady or normal operating mode.

As shown in FIG. 3A, the amount of the air ARO supplied to the reforming unit 136 is increased in one step (i.e., in a stepped fashion) and is kept at the increased level for a predetermined period of time Δt that starts from time t1, time t2 and time t3. In accordance with the increase in the amount of the air ARO, the O/C ratio as shown in FIG. 3B exceeds the above-indicated appropriate range (i.e., about 0.7 to 1.0) of the O/C ratio for the steady operating mode, and is increased to about 1.5. Namely, an excessive amount of the air ARO is supplied to the reforming unit 136 during the predetermined period of time Δt. Here, the term "excessive amount of the air ARO" means an amount of the air ARO that causes the O/C ratio to exceed the above-indicated appropriate range for the steady operating mode of the fuel cell system 60. Hereinafter, the period of time Δt will be referred to as "carbon removal period" or "carbon combustion period", and a process carried out in the reformer 130 during the carbon removal term Δt will be referred to as "carbon removal process".

The supply of the excessive amount of the air ARO to the reforming unit 136 permits combustion of the carbon deposited and accumulated on the reforming catalyst. If the excessive amount of the air ARO is continuously supplied to the reforming unit 136, however, the reforming catalyst may be heated to an undesirably high temperature. In the first example of the control method, therefore, the carbon removal period Δt is set to a relatively short period of about several seconds, and a plurality of carbon removal periods Δt are arranged at substantially regular intervals. In other words, the carbon removal process is intermittently or periodically executed a plurality of times. This arrangement makes it possible to reduce an amount of carbon deposited and accumulated on the reforming catalyst, by burning the deposited carbon while preventing the excessive heating of the reforming catalyst. It is, however, to be understood that the carbon removal process may be executed only once, namely, carbon deposited on the reforming catalyst may be removed during a single carbon removal period.

Hereinafter, an operating mode of the fuel cell system 60 which includes at least one carbon removal period Δt will be referred to as "carbon removal mode operation".

Figure 4:
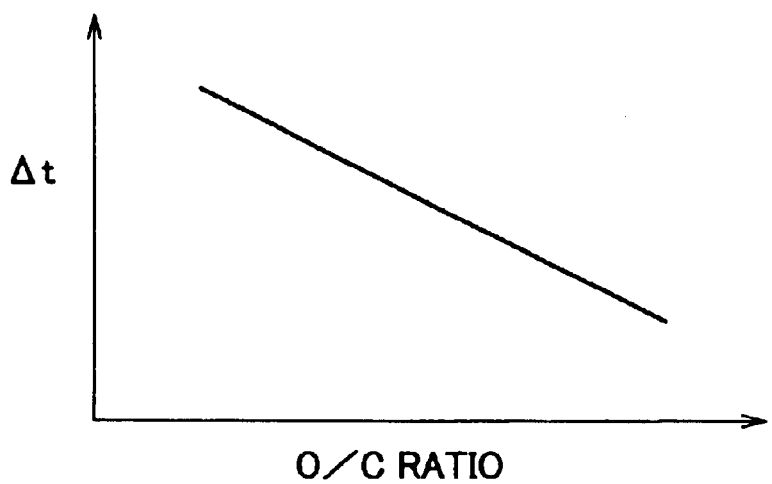
FIG. 4 is a graph representing a relationship between a ratio of the number of oxygen atoms to the number of carbon atoms (O/C ratio) and a length $\Delta t$ of a carbon removal period.

FIG. 4 shows a map indicating one example of a relationship between the O/C ratio during the carbon removal period Δt and the length of the carbon removal period Δt. This map is prepared on the assumption that the amount of the carbon to be removed during the carbon removal mode operation is constant, and that the number of execution of the carbon removal process (i.e., the number of the carbon removal periods Δt) is constant. It will be understood from the map of FIG. 4 that the O/C ratio is reduced as the length of the carbon removal period Δt is increased, whereby the amount of the air ARO to be supplied to the reforming unit 136 can be reduced. Conversely, the O/C ratio is increased as the length of the carbon removal period Δt is reduced. If the amount of carbon to be removed during the carbon removal mode operation of the fuel cell system 60 is increased, the line (representing the relationship between the O/C ratio and the period Δt) on the map of FIG. 4 is shifted upwards. The control unit 70 determines the length of the carbon removal period Δt and the amount of the air ARO to be supplied to the reforming unit 136, referring to various predetermined maps including that of FIG. 4.

Figure 5:
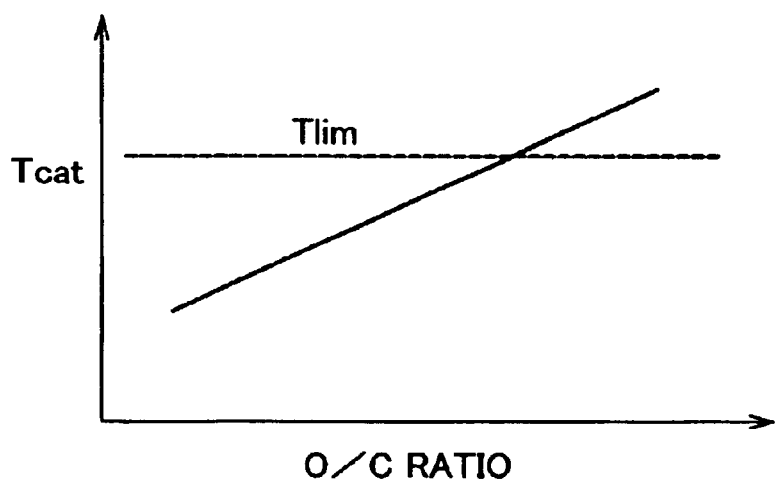
FIG. 5 is a graph representing a relationship between the ratio of the number of oxygen atoms to the number of carbon atoms and a catalyst temperature Tcat.

FIG. 5 shows a map indicating one example of a relationship between the O/C ratio during the carbon removal period Δt and a catalyst temperature Tcat. This map is prepared on the assumption that the amount of the carbon to be removed during the carbon removal mode operation is constant, and that the length of the carbon removal period Δt is constant. In the case where the length of the carbon removal term Δt is constant, the catalyst temperature Tcat is likely to increase with an increase in the O/C ratio. An excessive increase of the catalyst temperature may cause deterioration of the catalyst, and is thus considered undesirable. To avoid this situation, the control unit 70 determines the amount of the air fed to the reforming unit 136 so that the catalyst temperature Tcat is kept lower than a predetermined upper limit Tlim during the carbon removal period Δt.

As is understood from the foregoing description, the control unit 70 determines the length of the carbon removal period Δt, the number of execution of the carbon removal process and the O/C ratio (i.e., the amount of the air ARO fed to the reforming unit 136), referring to the maps shown in FIGS. 4 and 5 by way of example, while taking into account the amount of carbon to be removed in the carbon removal mode operation, the upper limit Tlim of the temperature of the reforming catalyst, and other parameters.

The control unit 70 may monitor the temperature of the reforming catalyst by means of the temperature sensor 192 (see FIG. 2). In this case, the control unit 70 may operate the fuel cell system 60 in the carbon removal mode by controlling at least one parameter including the length of the carbon removal period Δt, the number of execution of the carbon removal process and the O/C ratio, so that the temperature of the reforming catalyst does not exceed the upper limit Tlim.

Figure 6:
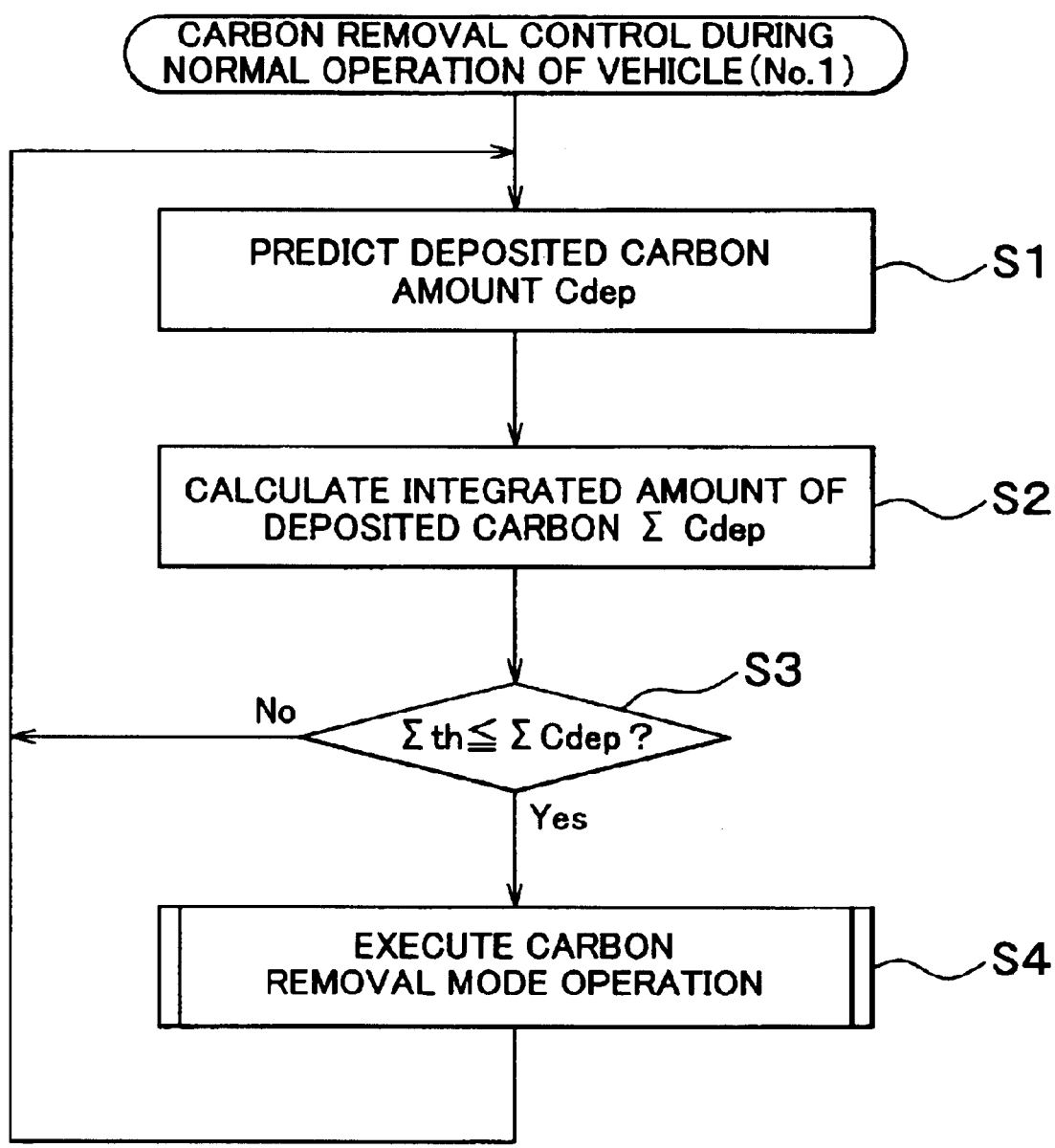
FIG. 6 is a flowchart showing a first example of a control routine for determining the timing of carbon removal control, which routine is executed when the electric vehicle of FIG. 1 is in a normal operating mode.
Figure 7:
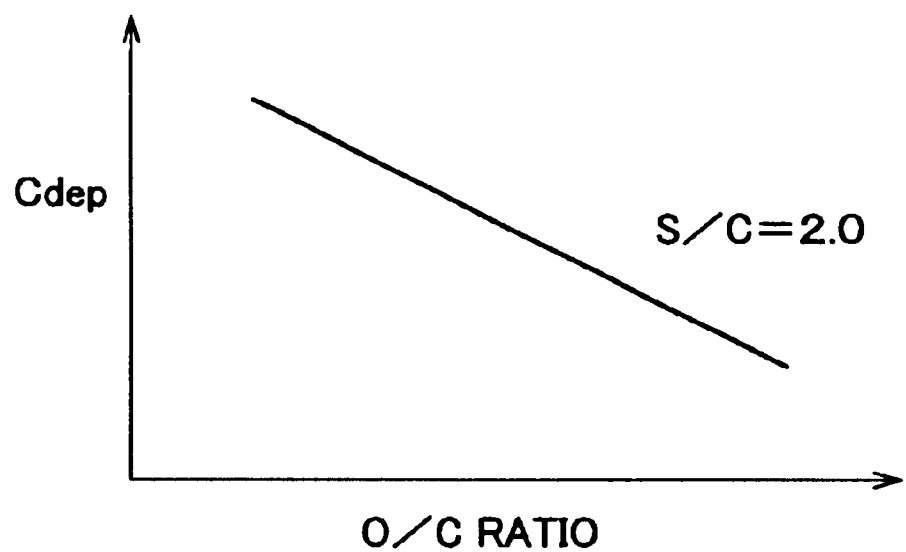
FIG. 7 is a graph representing an example of predicted values of an amount of deposited carbon Cdep per unit time, with respect to the O/C ratio.

FIG. 6 shows a flowchart illustrating a first example of a control routine of carbon removal control performed by the control unit 70 when the vehicle is running in a normal operating mode. In step S1, the control unit 70 predicts an amount of carbon Cdep deposited on the reforming catalyst per unit time while the vehicle is in the normal operating condition. FIG. 7 shows a map indicating predicted values of the amount of the deposited carbon Cdep per unit time, in relation to the O/C ratio. If the S/C ratio is constant, the amount of deposited carbon Cdep is reduced with an increase in the O/C ratio. A plurality of maps each indicating predicted values of the amount of deposited carbon Cdep per unit time, in relation to each of a plurality of values of the S/C ratio, may be prepared in advance and stored. An actual amount of deposited carbon Cdep is also proportional to the amount of raw fuel fed to the reforming unit 136. Accordingly, the control unit 70 calculates an amount of deposited carbon Cdep at each operating point of the vehicle, on the basis of the S/C ratio, the O/C ratio, and the amount of raw fuel (gasoline) supplied to the reforming unit 136.

Step S2 is then executed to calculate an integrated amount of deposited carbon Σ Cdep (i.e., an amount of carbon accumulated on the reforming catalyst), by integrating the predicted amount of deposited carbon Cdep with respect to time. In step S3, the obtained integrated amount of deposited carbon Σ Cdep is compared with a predetermined threshold value Σth. If the integrated amount of deposited carbon Σ Cdep is smaller than the threshold value Σth, control returns to step S1. If the integrated amount of deposited carbon Σ Cdep is equal to or larger than the threshold value Σth, control proceeds to step S4 to execute the carbon removal mode operation of the fuel cell system 60.

Figure 8:
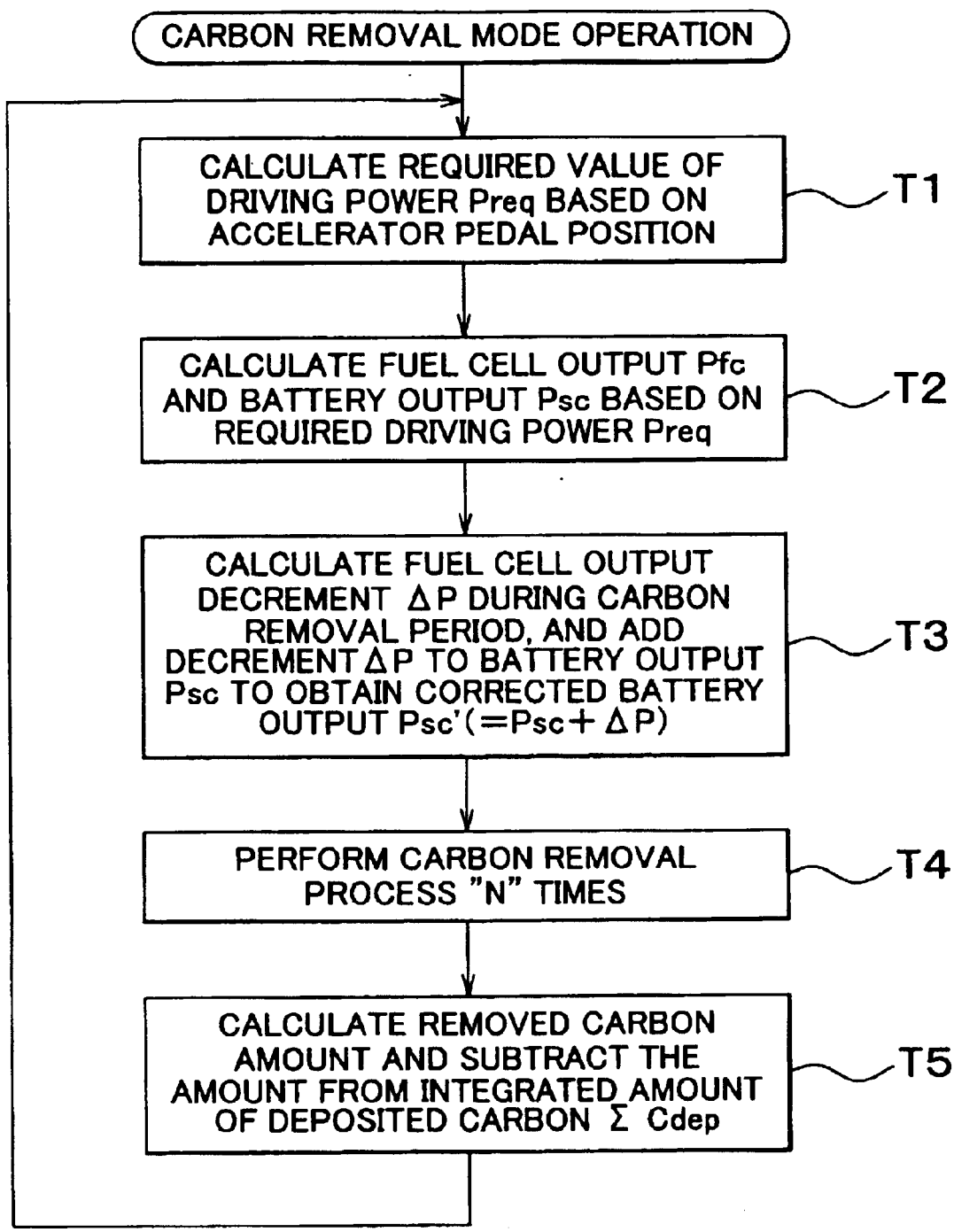
FIG. 8 is a flowchart illustrating an example of a control routine executed when the fuel cell system is operated in the carbon removal mode.

FIG. 8 shows a flowchart illustrating an example of a control routine executed by the control unit 70 when the fuel cell system 60 is in the carbon removal mode. In step T1, the control unit 70 calculates a required value of driving power Preq of the motor 20 on the basis of an accelerator pedal position, or the like. Step T2 is then executed to distribute or divide the required driving power Preq into a fuel cell output Pfc and a battery output Psc, depending upon the current operating state of the fuel cell system 60 and a quantity of electric energy stored in the battery 50.

Step T3 is then executed to calculate a decrement ΔP of the fuel cell output during the carbon removal period Δt when the fuel cell system 60 is in the carbon removal mode. The decrement ΔP is calculated in accordance with the amount of air ARO fed into the reforming unit 136 within the carbon removal period Δt, i.e., the O/C ratio. The obtained decrement ΔP is added to the output Psc assigned to the battery, so that a final battery output Psc' is determined. In this manner, the output power of the battery 50 compensates for a reduction in the output power of the fuel cell 140 resulting from the carbon removal mode operation, so that the battery 50 and the fuel cell 140 cooperate to supply the motor 20 with the required amount of driving power.

In step T4, the control unit 70 causes the fuel cell system 60 to operate in the carbon removal mode by executing the carbon removal process once or a plurality of times (Nth time(s)). Step T5 is then executed to calculate an amount of carbon removed during the carbon removal mode operation. The thus obtained amount of removed carbon is subtracted from the integrated amount of deposited carbon Σ Cdep. The amount of carbon removed by the carbon removal mode operation of the fuel cell system 60 may be calculated in accordance with the length of the carbon removal period Δt, the number of execution N of the carbon removal process, and the O/C ratio. This permits a proper evaluation of the integrated amount of deposited carbon Σ Cdep after the carbon removal mode operation. Upon termination of the carbon removal mode operation of the fuel cell system 60, the control unit 70 returns to step S1 of the flowchart of FIG. 6 to execute steps S1–S4 repeatedly.

In the first example of control method as described above, the integrated amount of carbon Σ Cdep deposited on the reforming catalyst is calculated, and the carbon removal mode operation is performed when the calculated amount of deposited carbon Σ Cdep becomes equal to or larger than the predetermined threshold value Σth. In this manner, the integrated amount of carbon Σ Cdep deposited on the reforming catalyst can be restricted to be equal to or smaller than a predetermined value. Consequently, the activity of the reforming catalyst is prevented from being excessively deteriorated. Further, the carbon removal mode operation is not performed if the integrated amount of deposited carbon Σ Cdep is still small, thereby preventing a waste of the raw fuel by executing an unnecessary carbon removal mode operation.

The integrated amount of deposited carbon Σ Cdep (i.e., the amount of carbon accumulated on the reforming catalyst) may be calculated according to any other possible method than the above-described method. In general, the amount of carbon accumulated in the reformer 130 may be calculated on the basis of the history of the operating state of the reformer 130.

Figure 9:
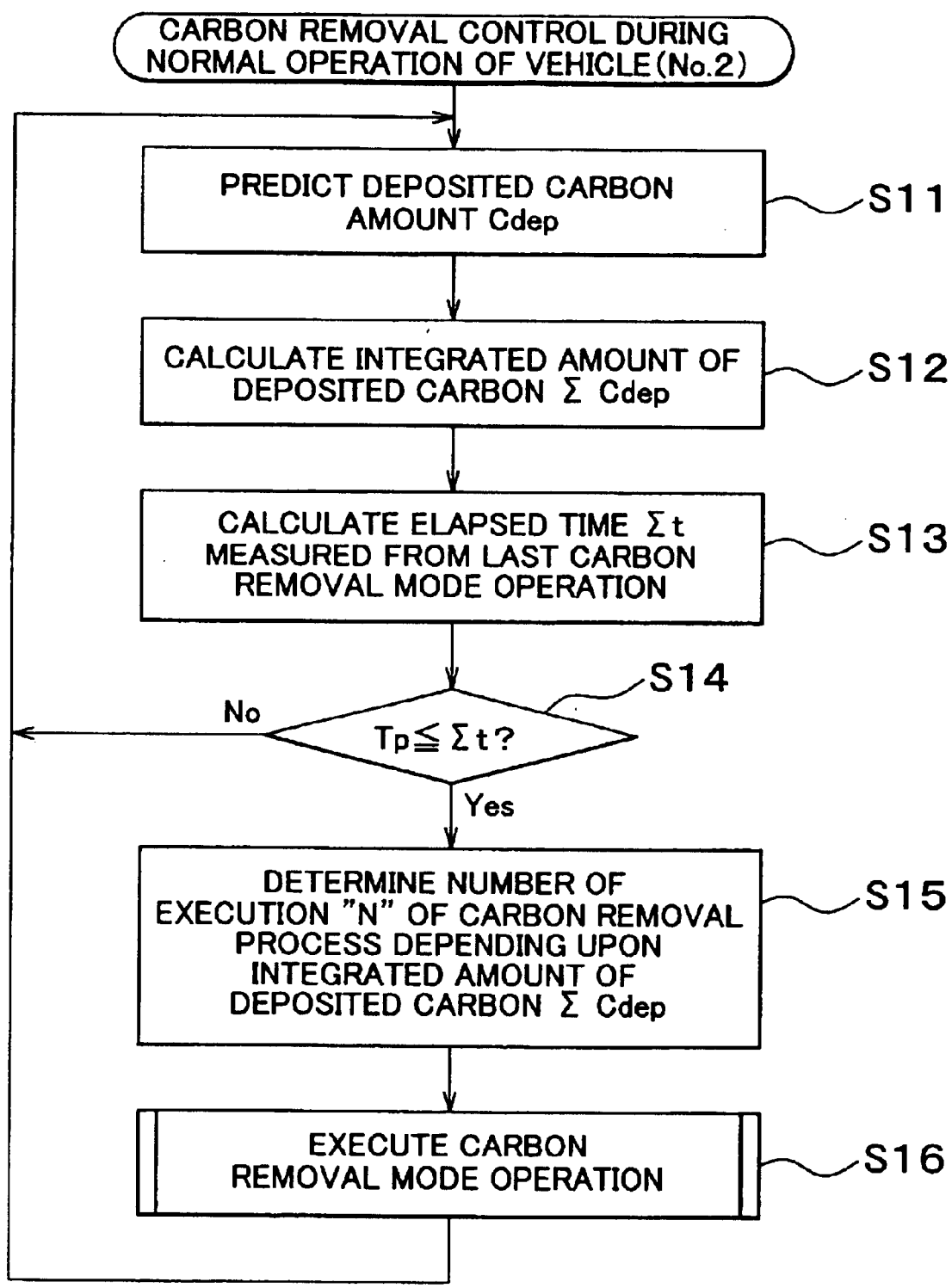
FIG. 9 is a flowchart showing a second example of a control routine for determining the timing of carbon removal control, which routine is executed when the electric vehicle of FIG. 1 is in a normal operating mode.

FIG. 9 shows a flowchart illustrating a second example of a control routine of carbon removal control performed by the control unit 70 when the vehicle is running in a normal operating mode. In steps S11 and S12, the integrated amount of deposited carbon Σ Cdep is calculated in the same manner as explained above with respect to step S1 and S2 of the control routine of FIG. 6. Step S13 is then executed to calculate an elapsed time Σt from the last carbon removal mode operation. In step S14, the obtained elapsed time Σt is compared with a predetermined threshold value Tp. If the elapsed time Σt is less than the threshold value Tp, control returns to step S11. If the elapsed time Σt is equal to or greater than the threshold value Tp, on the other hand, control proceeds to step S15 to determine the number of execution "N" of the carbon removal process during the following carbon removal mode operation, depending upon the integrated amount of deposited carbon Σ Cdep.

Figure 10:
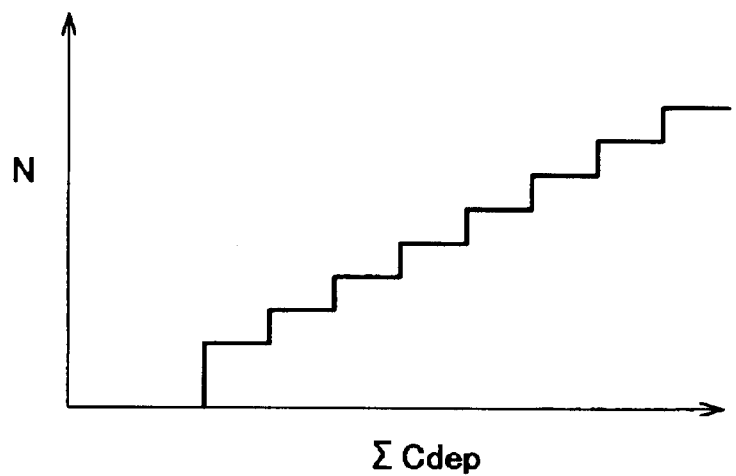
FIG. 10 is a graph representing an example of a relationship between an integrated amount of deposited carbon ΣCdep and the number of execution of the carbon removal process.

FIG. 10 shows one example of a map representing a relationship between the integrated amount of deposited carbon Σ Cdep and the number of execution "N" of the carbon removal process. As is understood from FIG. 10, the larger the integrated amount of deposited carbon Σ Cdep, the larger the number of execution "N" of the carbon removal process. Referring back to the control routine of FIG. 9, when the number of execution "N" of the carbon removal process is determined in step S15, control proceeds to step S16 to execute the carbon removal mode operation that includes the determined number "N" of execution of the carbon removal process. Meanwhile, the carbon removal mode operation is carried out according to the same control routine as illustrated in FIG. 8. In the first example of the control method, the carbon removal process is executed at predetermined time intervals Tp, so that the carbon is prevented from being excessively accumulated or deposited on the reforming catalyst.

In the first example of the control method as described above, an excessive amount of the air ARO is supplied to the reforming unit 136 during the carbon removal mode operation of the fuel cell system 60 so that the O/C ratio becomes greater than the appropriate range of the O/C ratio to be achieved in the steady operating mode. As a result, the carbon deposited and accumulated on the reforming catalyst is removed through combustion thereof, and an excessive reduction in the activity of the reforming catalyst can be avoided.

Second Example of Control Method

Figure 11A:
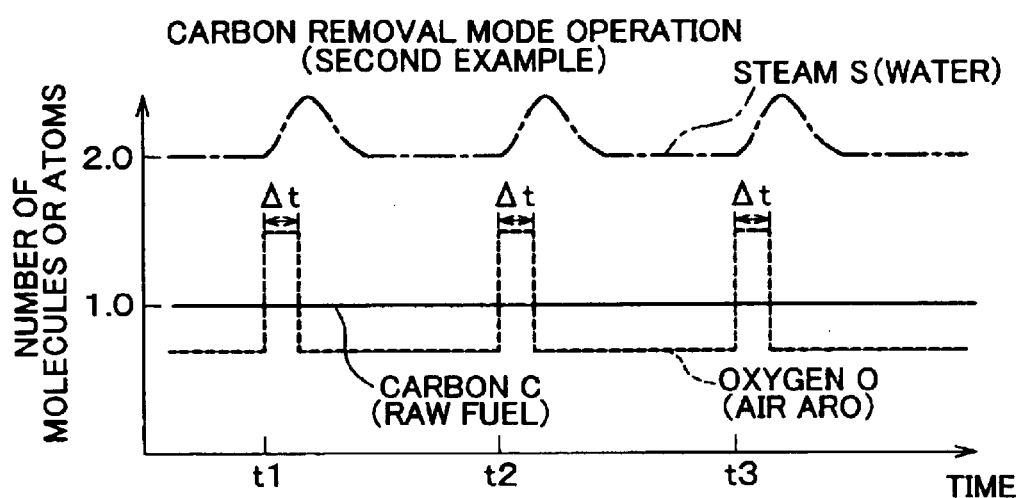
FIGS. 11A–11C are graphs useful for explaining the manner of operating the fuel cell system of FIG. 2 in the carbon removal mode, according to a second example of a control method.
Figure 11B:
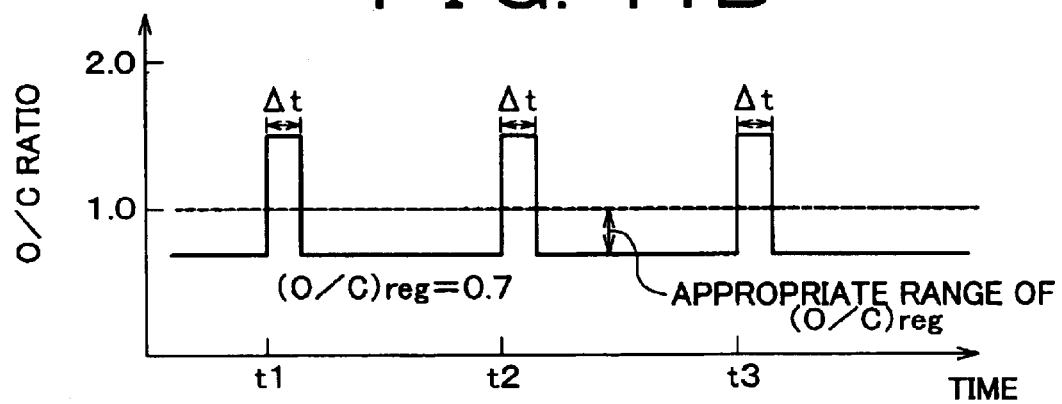
Figure 11C:
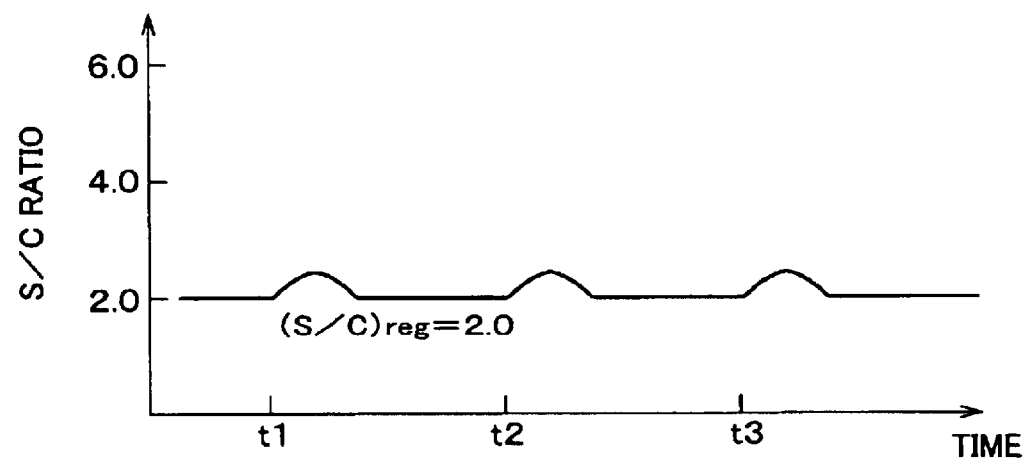

FIGS. 11A–11C are graphical illustrations explaining a manner of operating the fuel cell system 60 in a carbon removal mode, according to a second example of control method. The manner of operating the fuel cell system 60 according to the second control method is different from that of the first control method as illustrated in FIGS. 3A–3C only in that the amount of water (the number of steam molecules S) supplied to the reforming unit 136 is varied, and the resulting S/C ratio is accordingly varied. The amount of supplied raw fuel (the number of carbon atoms C), the amount of supplied air ARO (the number of oxygen atoms O) and the O/C ratio are controlled in substantially the same manner as in the first example of the control method.

In the second control method, the control unit 70 monitors the temperature of the reforming catalyst by means of the temperature sensor 192 (shown in FIG. 2), and controls the amount of water fed to the reforming part 136 so that the temperature of the reforming catalyst does not exceed a predetermined upper limit. Described in detail, when an excess amount of oxygen is fed to the reforming part 136 during each carbon removal period Δt, the temperature of the reforming catalyst (not shown) is gradually increased. In response to the increase in the catalyst temperature, the control unit 70 increases the amount of water supplied to the reforming part 136, resulting in an increase in the likelihood of the steam reforming reaction in the reforming unit 136. Since the stream reforming is an endothermic reaction, the increased stream reforming reaction is effective to lower the temperature of the reforming catalyst. Thus, the control unit 70 controls the amount of water fed to the reforming unit 136 in the manner as illustrated in FIG. 11A, thus controlling the catalyst temperature to be kept equal to or lower than the predetermined upper limit.

According to the second example of the control method as described above, the amount of water supplied to the reforming unit 136 is suitably controlled during the carbon removal process, thus preventing deterioration of the reforming catalyst by heat.

Third Example of Control Method

Figure 12A:
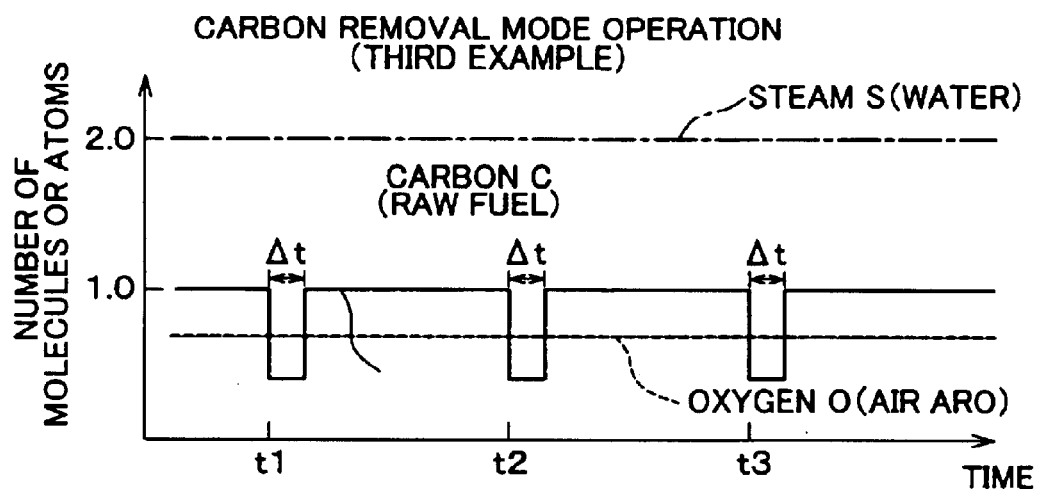
FIGS. 12A–12C are graphs useful for explaining the manner of operating the fuel cell system of FIG. 2 in the carbon removal mode, according to a third example of a control method.
Figure 12B:
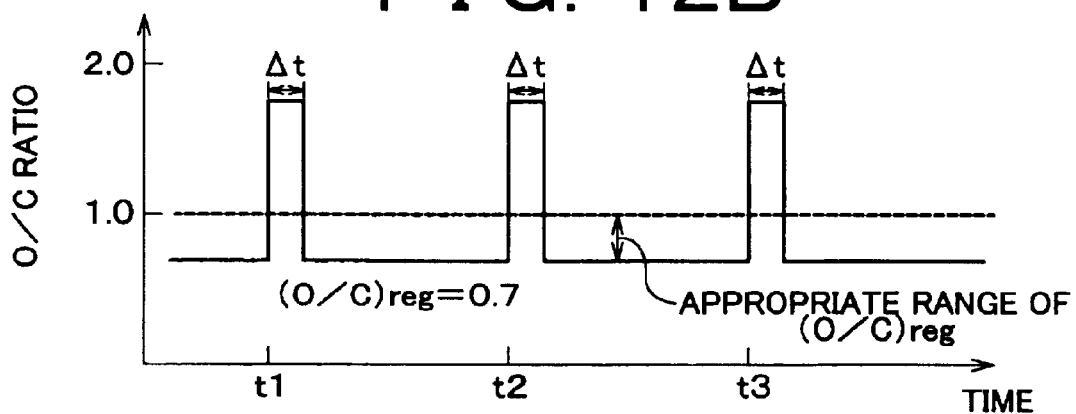
Figure 12C:
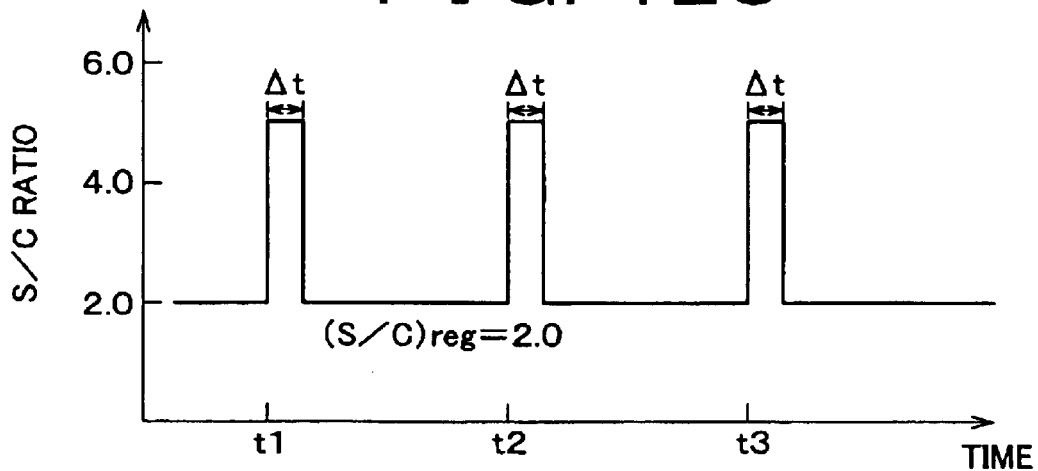

FIGS. 12A–12C are graphical illustrations explaining a manner of operating the fuel cell system 60 in a carbon removal mode, according to a third example of control method. The manner of operating the fuel cell system 60 according to the third control method is different from that of the first control method as illustrated in FIGS. 3A–3C in that the amount of air ARO (the number of oxygen atoms O) supplied to the reforming unit 136 is kept constant during each carbon removal term Δt, and the amount of the raw fuel (the number of carbon atoms C) is reduced during each carbon removal period Δt.

As is understood from a comparison between FIG. 12B and FIG. 3B, the O/C ratio changes in the third control method in the same manner as in the first control method. That is, an oxygen-excessive condition in the reforming unit 136 may also be provided by reducing the amount of the raw fuel, thus permitting combustion of the carbon deposited and accumulated on the reforming catalyst.

According to the third example of the control method, the S/C ratio is increased, namely, the amount of supplied steam relative to that of supplied raw fuel is increased, during the carbon removal period Δt. With the S/C ratio thus increased, the steam reforming reaction, which is an endothermic reaction, is likely to occur in the reforming unit 136 during the carbon removal period Δt, and the reforming catalyst is prevented from being undesirably heated. In this respect, the amount of steam supplied to the reforming unit 136 may also be controlled so that the temperature of the reforming catalyst does not exceed the predetermined upper limit, as in the second control method as illustrated in FIGS. 11A–11C. The control of the temperature of the reforming catalyst through control of the amount of supplied steam is equally applicable to the following examples of the control method.

Fourth Example of Control Method

FIG. 13 shows a flowchart illustrating a control routine for determining the timing of execution of a carbon removal mode operation, according to a fourth example of control method. While the aforementioned first through third control methods as described above are concerned with only the carbon removal mode operation executed when the vehicle is in a normal operating or driving condition, the carbon removal mode operation is executed in different manners in accordance with various vehicle operating or driving conditions, according to the fourth example of the control method.

With the control routine of FIG. 13 having steps S21 through S25, the carbon removal mode operation is carried out when the vehicle is in any one of the following four operating conditions, namely, (1) a startup condition, (2) an idling condition, (3) a decelerating condition and (4) a key-off condition.

The vehicle is in the "startup condition" during a period immediately following a start of the operation of the fuel cell system 60 after switching of the ignition key from the OFF position to the ON position. The vehicle is in the "idling condition" when the vehicle is stopped and the operating amount of the accelerator pedal 74 is zero while the fuel cell system 60 is being operated. For instance, the vehicle is judged as being in the idling condition if the fuel cell system 60 operates to charge the battery 50 when the vehicle is stopped. The vehicle is in the "decelerating condition" when the vehicle is travelling or running, and the operating amount of the accelerator pedal 74 is zero. The vehicle is in the "key-off condition" after the ignition key is switched from the ON position to the OFF position and immediately before the operation of the fuel cell system 60 is completely stopped.

In the above-indicated four conditions, the required output value of the fuel cell 140 is relatively small, and the amount of hydrogen to be supplied to the fuel cell 140 is accordingly small. Thus, the carbon removal mode operations performed in these four vehicle operating conditions are advantageous in terms of a relatively small advance influence on the driving state of the vehicle. The carbon removal mode operations may be performed in different manners in the respective vehicle operating conditions, as will be described below.

Figure 14A:
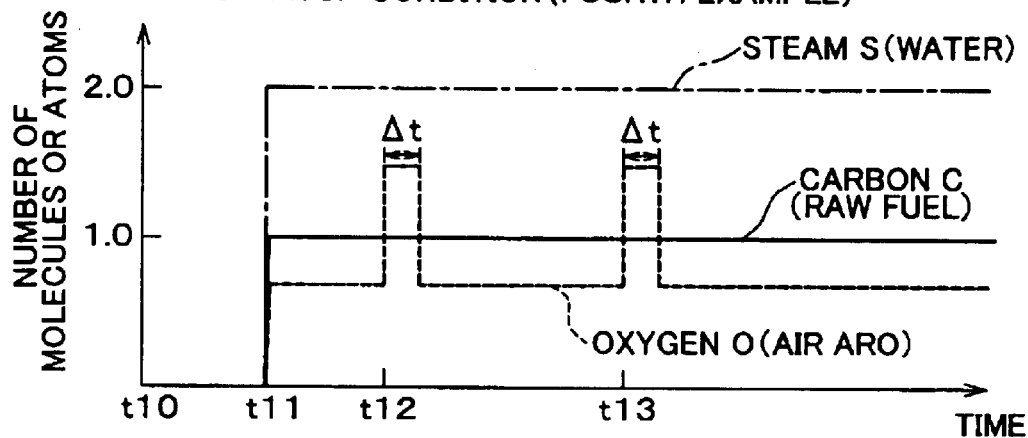
FIGS. 14A–14C are graphs useful for explaining the manner of operating the fuel cell system of FIG. 2 in the carbon removal mode when the vehicle is in a startup condition.
Figure 14B:
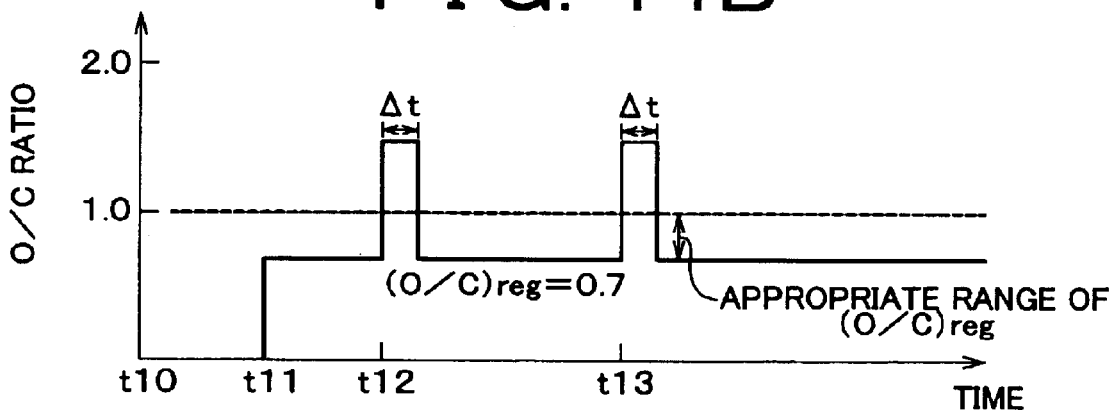
Figure 14C:
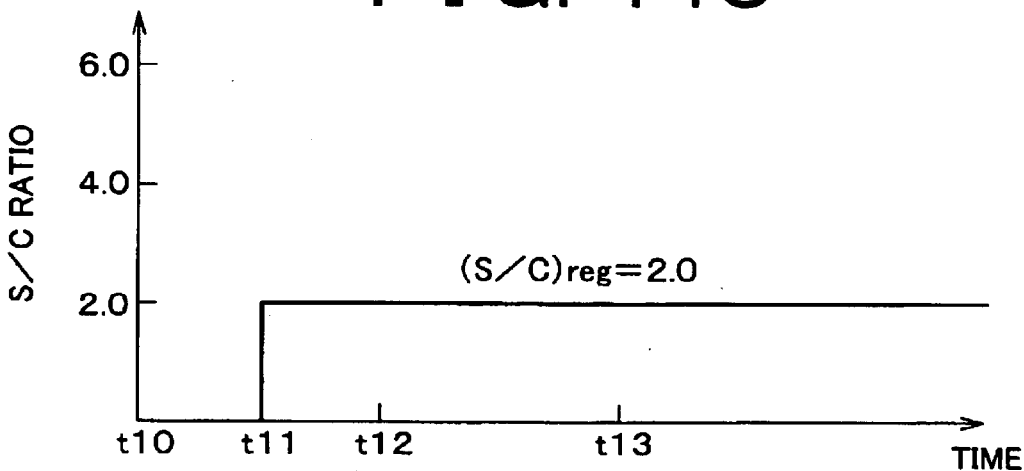

FIGS. 14A–14C are graphical illustration explaining a manner of operating the fuel cell system 60 in the carbon removal mode when the vehicle is in the startup condition.

At time t10, the ignition key of teh vehicle is placed in the ON position, and the operation of the fuel cell system 60 is started. During a period between time t10 and time t11, only the catalyst heating unit 134 (FIG. 2) is operated so that its temperature is elevated. At t11 at which the temperature of the catalyst heating unit 134 is rasied to a certain high level, the water and the raw fuel start being supplied to the vaporizing unit 132, and the air ARO start being supplied from the air supply device 166. Subsequently, the carbon removal process is executed during each carbon removal period Δt that starts from time t12 and time t13.

Figure 15A:
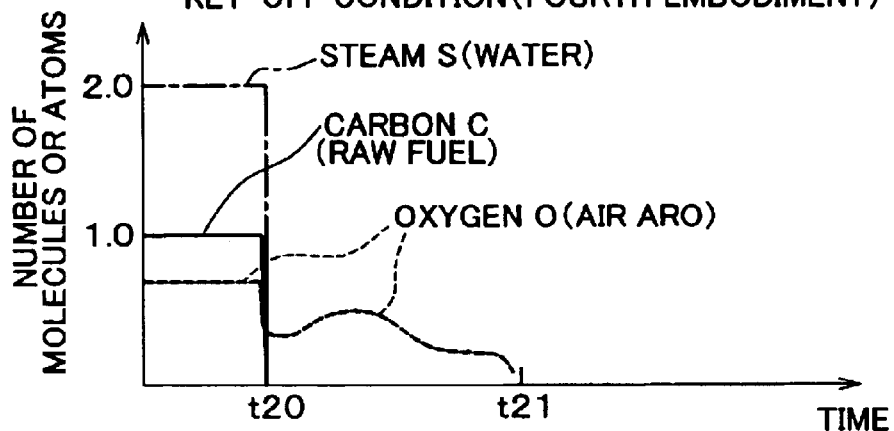
FIGS. 15A–15C are graphs useful for explaining the manner of operating the fuel cell system of FIG. 2 in the carbon removal mode when the vehicle is in a key-off condition.
Figure 15B:
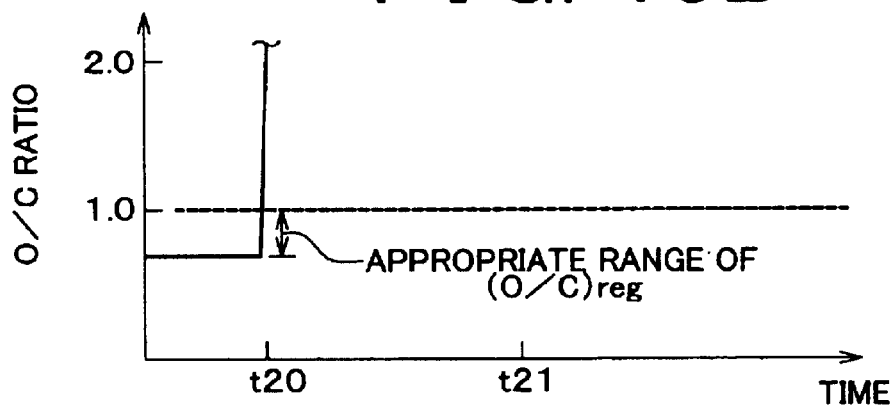
Figure 15C:
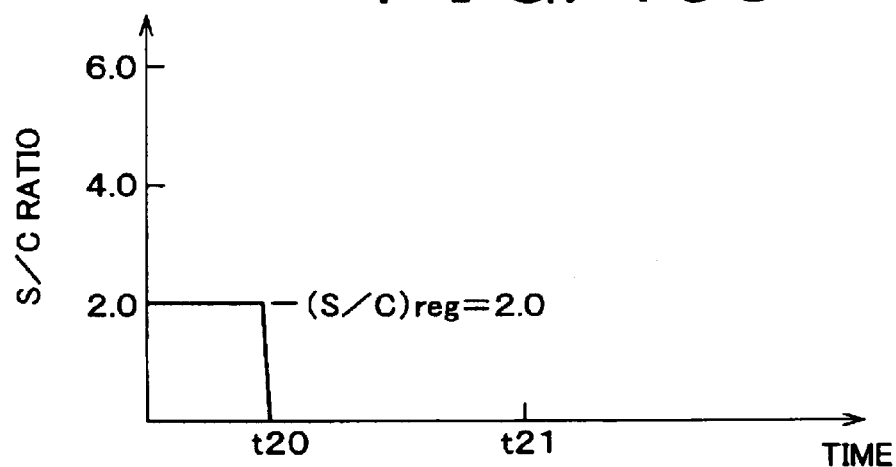

FIGS. 15A–15C are graphical illustrations explaining a manner of operating the fuel cell system 60 in the carbon removal mode when the vehicle is in the key-off condition. At time t20, the ignition key of the vehicle is placed in the OFF position, and the operation of the fuel cell 140 is terminated. Thus, the amounts of water and raw fuel supplied to the reformer 130 become close to zero. However, the control unit 70 operates to continue the supply of the air ARO up to time t21. As a result, the carbon deposited and accumulated on the reforming catalyst is burned and removed during a period between time t20 and time t21 (which period will be referred to as "carbon removal period". In this carbon removal period t20–t21, the amount of supplied air ARO is suitably controlled so as not to cause an excessive increase in the temperature of the reforming catalyst.

As is apparent from FIG. 15B, the O/C ratio in the carbon removal period t20–t21 is greatly larger than the appropriate range of the O/C ratio (i.e., the range of about 0.7 to about 1.0) for the steady operating mode of the fuel cell system 60. Namely, the O/C ratio increases to infinity since no raw fuel is supplied to the reformer 130 in the carbon removal period t20–t21. It will be understood that the situation in which "the O/C ratio is greatly larger than the appropriate range" as stated above includes a situation in which the amount of raw fuel supply is zero while the amount of the air ARO supply is not zero.

The carbon removal mode operation for the idling and decelerating conditions of the vehicle may be performed according to a manner similar to those of the first through third control methods as illustrated in FIGS. 3A, 11A, 12A, respectively. However, since the required output power of the fuel cell 140 and the required amount of hydrogen are relatively small in the idling and decelerating conditions of the vehicle, the required amounts of the water, the raw fuel and the air supplied to the reformer 130 are significantly smaller than those of the case where the vehicle is running in a normal operating mode.

According to the fourth example of the control method as described above, the carbon removal mode operation of the cell fuel system 60 is performed when the required output power of the fuel cell 140 is small, thus causing a significantly reduced influence on the driving condition of the vehicle. It is appreciated that the carbon removal mode operation need not be performed in all of the above-indicated four operating conditions of the vehicle, but may be performed in one or more of the four operating conditions of the vehicle. Other than the above-indicated four operating conditions of the vehicle, the carbon removal mode operation may be performed during the operation of the fuel cell system 60 if the required output power of the fuel cell 140 is lower than a predetermined value. Alternatively, the carbon removal mode operation of the fuel cell system 60 may be performed when a required output power of the motor 20 is lower than a predetermined value.

Fifth Example of the Control Method

Figure 16:
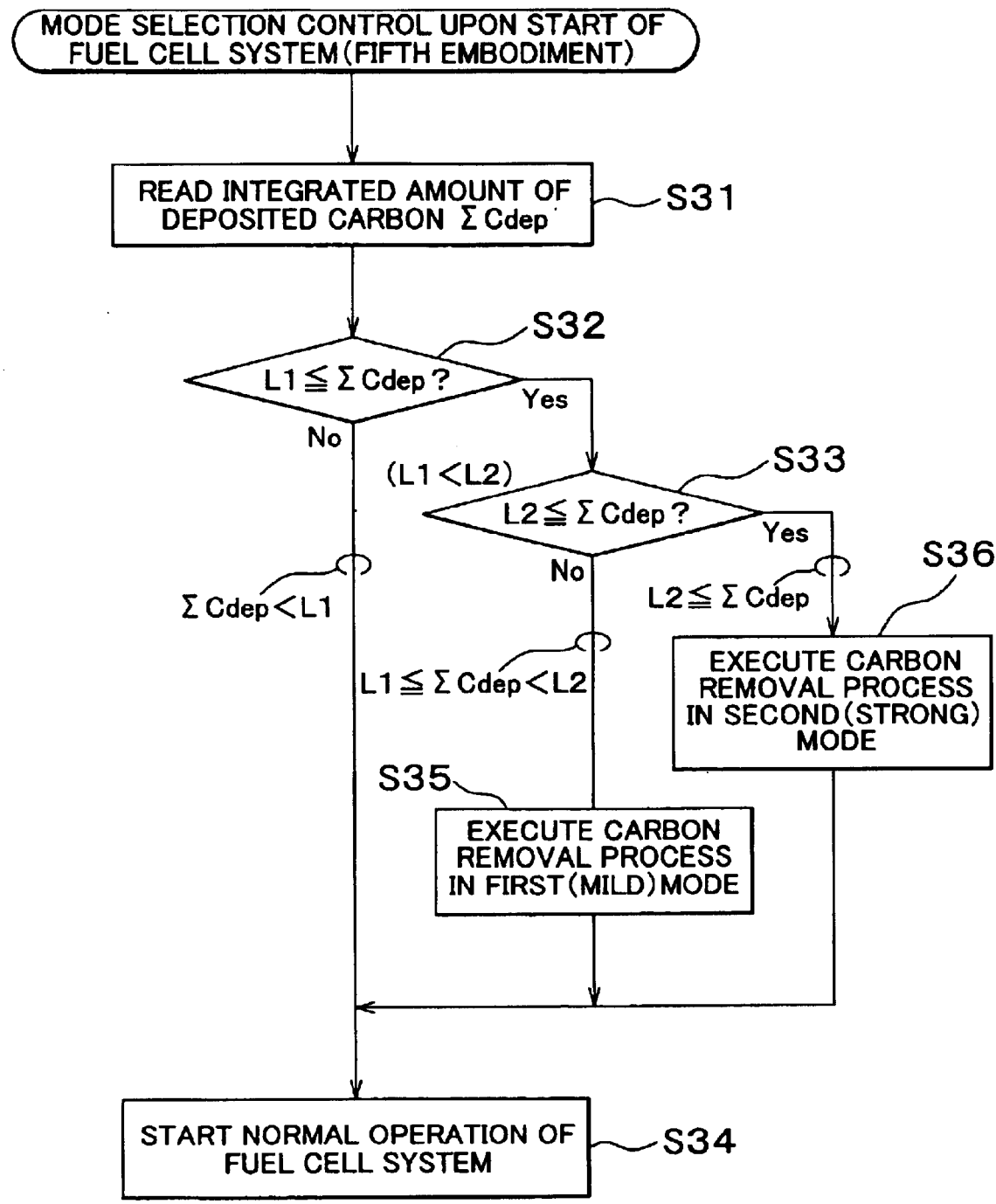
FIG. 16 is a flowchart illustrating a control routine of carbon removal control upon a start of the fuel cell system according to a fifth example of control method.

FIG. 16 shows a flowchart illustrating a control routine of carbon removal control according to a fifth example of control method. In this example, the carbon removal mode operation is performed upon a start of the fuel cell system 60 in different manners, depending upon the amount of carbon accumulated on the reforming catalyst. Here, "the start of the fuel cell system 60" means a cold start of the fuel cell system 60 upon which the fuel cell system 60 is started at a room temperature.

In step S31, the control unit 70 reads the integrated amount of deposited carbon ΣCdep from the memory 71 (shown in FIG. 2). The memory 71 may be a nonvolatile memory, such as EEPROM.

In step S32, the integrated amount of deposited carbon Σ Cdep is compared with a first threshold value L1. If the integrated amount of deposited carbon Σ Cdep is smaller than the first threshold value L1, control proceeds to step S34 to start operating the fuel cell system 60 in a normal or steady operating mode, without executing a carbon removal mode operation. On the other hand, if the integrated amount of deposited carbon Σ Cdep is equal to or larger than the first threshold value L1, control proceed to step S33 to compare the integrated amount of deposited carbon Σ Cdep with a second threshold value L2. The second threshold value L2 is set to be larger than the first threshold value L1.

If the integrated amount of deposited carbon Σ Cdep is smaller than the second threshold value L2, control proceeds to step S35 to perform the carbon removal process in a first mode. If the integrated amount of deposited carbon Σ Cdep is equal to or greater than the second threshold value L2, on the other hand, control proceed to step S36 to perform the carbon removal process in a second mode. In this example, the first mode is a relatively mild mode in which a relatively small amount of carbon is removed, and the second mode is a relatively strong mode in which a relatively large amount of carbon is removed.

For example, the carbon removal process according to the first mode (mild mode) may be carried out in the manner as illustrated in FIGS. 14A–14C. The carbon removal process according to the second mode (strong mode) may be carried out in any manner provided that the amount of carbon removed in this carbon removal process is larger than that removed in the carbon removal process according to the first mode. For example, the carbon removal process according to the second mode may be carried out in the manner as illustrated in FIGS. 17A–17C.

Figure 17A:
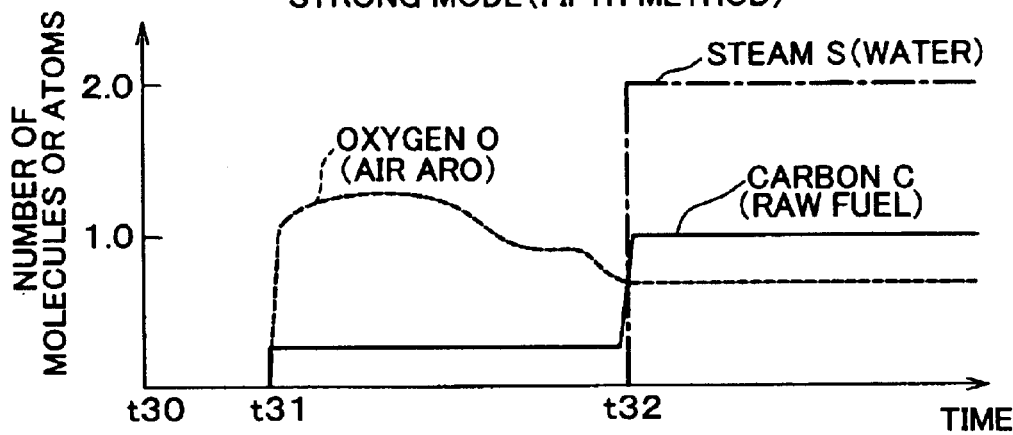
FIGS. 17A–17C are graphs useful for explaining the manner of operating the fuel cell system of FIG. 2 in a strong carbon removal mode according to the fifth example of the control method, when a relatively large amount of carbon is deposited in the reformer.
Figure 17B:
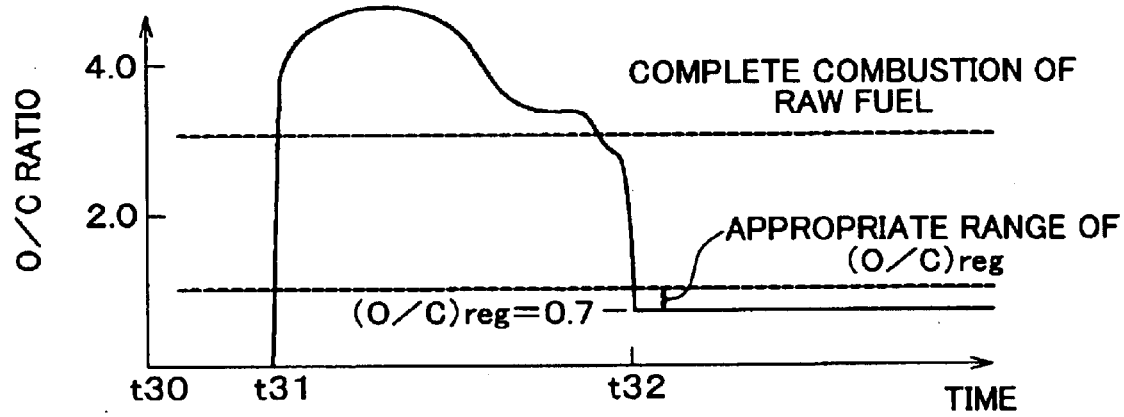
Figure 17C:
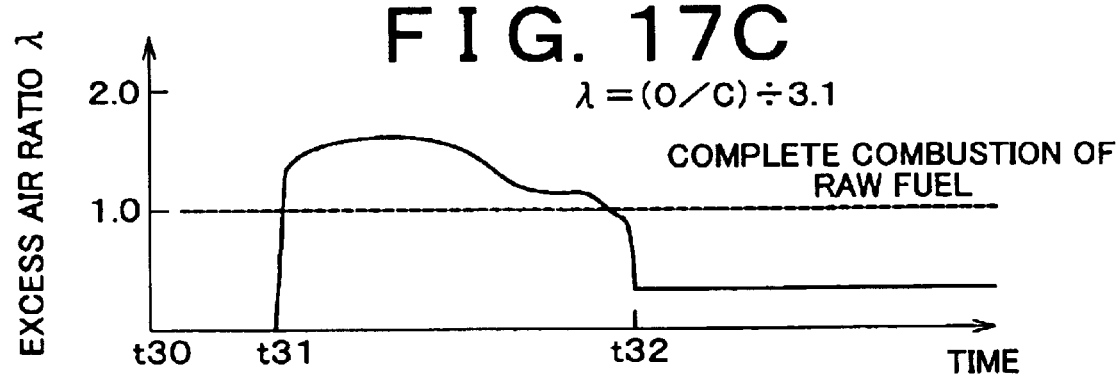

As shown in FIGS. 17A–17C, the operation of the fuel cell system 60 is started at time t30. During a period between time t30 and time t31, only the catalyst heating unit 134 (FIG. 2) is operated so that its temperature is elevated. When the temperature of the catalyst heating unit 134 is raised to a certain high level at time t31, the carbon removal process is executed during a period (i.e., a carbon removal period) between time t31 and time t32. In the carbon removal period t31–t32, no steam is fed to the reforming unit 136, and only the raw fuel gas (gasoline) and the air (ARO) are fed to the reforming unit 136. At this time, the electric heating part 135 is used for heating the raw fuel gas and the air ARO to a temperature high enough to burn carbon deposited and accumulated on the reforming catalyst.

In the carbon removal period t31–t32, the amount of raw fuel supplied to the reforming unit 136 is made smaller than that of the case where the fuel cell system 60 is in the steady operating mode, while the amount of the air ARO supplied to the reforming unit 136 is excessively increased. As is apparent from FIG. 17B, the O/C ratio is considerably larger than the appropriate range of the O/C ratio (i.e., the range of about 0.7 to about 1.0) for the steady operating mode, and has a peak value of about 4.8. In this example, it is assumed that the amount of supplied air that provides an O/C ratio of about 3.1 corresponds to an amount of oxygen required to achieve complete combustion of the supplied raw fuel. Thus, the amount of oxygen supplied to the reforming unit 136 during the carbon removal period t31–t32 is greater than the amount of oxygen required for the complete combustion of the supplied raw fuel.

FIG. 17C shows variation or changes in the excess air ratio λ in the reforming unit 136 of the reformer 130. Here, the "excess air ratio λ" means an index representing the ratio of the amount of oxygen supplied to the reforming unit 136 to the amount of oxygen required for complete combustion of the supplied raw fuel. Since it is assumed in this example that the O/C ratio required for complete combustion of the supplied raw fuel is about 3.1, the excess air ratio λ is approximately equal to a value obtained by dividing the O/C ratio by 3.1. If the excess air ratio λ exceeds 1, a part of the supplied oxygen remains without being used for oxidation of the raw fuel, and the remaining oxygen is used for removing carbon accumulated on the catalyst.

Namely, in the carbon removal period t31–t32, the raw fuel and the air ARO are heated by the electric heater 135 to a sufficiently high temperature, and the amount of the air supplied to the reforming unit 136 is greater than the air supply amount required for complete combustion of the raw fuel. This arrangement makes it possible to burn the deposited carbon accumulated on the reforming catalyst, resulting in a reduced amount of carbon accumulated on the reforming catalyst.

In the fifth example of the control method as described above, the control unit 70 monitors a temperature at each position in the reformer 130, using the temperature sensor 192 disposed in the reforming unit 136, and temperature sensors 232–236 disposed upstream or downstream of the respective units 136–139. The control unit 70 also controls the amount of air ARO supplied to the reforming unit 136 so that the temperatures of the catalysts incorporated in the respective units of the reformer 130 are raised as quickly as possible. With the amount of the supplied air ARO thus controlled, the catalysts disposed in the reforming unit 136, the shift reaction unit 138, and the partial-oxidation unit 139 are prevented from being excessively heated.

Instead of controlling the amount of the air ARO supplied to the reforming unit 136 while the amount of the supplied raw fuel is kept constant, the control unit 70 may control the amount of the raw fuel supplied to the reforming unit 136 while keeping the supply amount of the air ARO constant. Alternatively, the control unit 70 may control both of the amounts of the air ARO and the raw fuel supplied to the reforming unit 136, so as to provide a similar effect of preventing undesirable heating of the catalysts. Instead of using the temperature sensors, measurement values of oxygen concentration sensor(s) and/or fuel concentration sensor (s) may be used for controlling the amounts of the raw fuel and air ARO supplied.

In the carbon removal period t31–t32, it is also possible to supply only the air ARO to the reforming unit 136 without supplying the raw fuel gas (gasoline). However, if the raw fuel gas as well as the air ARO is supplied to the reforming part 136, the temperature of the catalyst will be more rapidly increased.

In the fifth example of the control method as described above, one of the two modes of the carbon removal process is selected depending upon the integrated amount of deposited carbon $\Sigma Cdep$, and the carbon removal process is carried out in the selected mode. However, the carbon removal process may be carried out in a selected one of three or more modes. Furthermore, since a suitable one of a plurality of modes of the carbon removal process is selected depending upon the integrated amount of deposited carbon $\Sigma Cdep$ in the fifth control method, an adaptive carbon removal process suitable for the integrated amount of deposited carbon $\Sigma Cdep$ can be performed.

Modified Examples

While the preferred embodiment and examples of the invention have been described in detail for the illustrative purpose only, it is to be understood that the invention is not limited to the details of the illustrated embodiments, but may be otherwise embodied with various changes, modifications or improvements, without departing from the scope of the invention. For instance, the following modified examples may be employed.

First Modified Example

While gasoline is used as the raw fuel supplied to the reformer, various other types of hydrocarbon-containing fuels may be employed as the raw fuel. For example, various types of hydrocarbon-containing compounds, including alcohols such as methanol, natural gas, aldehyde and ether, may be used for the raw fuel. If the selected raw fuel contains a higher hydrocarbon compound (i.e., a hydrocarbon-containing compound having four or more carbon atoms), the problem of deposition of carbon is serious. Therefore, the invention yields an appreciable effect if such a raw fuel is employed.

Second Modified Example

In the illustrated embodiment, the invention is applied to the electric vehicle equipped with the fuel cell system 60. The invention is also equally applicable to a hybrid vehicle (or hybrid car) having a motor and an internal combustion engine for driving or rotating wheels, and to various types of moving objects, such as vessels or trains, other than the automobiles or motor vehicles. In general, the invention is applicable to any moving object including a fuel cell, a fuel reforming apparatus, and a motor driven by power supplied from the fuel cell.

Third Modified Example

In the first through third examples of control methods as described above, the fuel cell system 60 is operated in a carbon removal mode by intermittently executing the carbon removal process in a plurality of carbon removal periods. In the fourth and fifth examples of control methods, the amount of oxygen or raw fuel supplied to the reforming unit 136 is continuously controlled over a single carbon removal period. As is understood from these examples, the carbon removal process of the invention only requires controlling the amount of the oxygen and/or the raw fuel to be supplied so that the O/C ratio exceeds the appropriate range for the steady operating mode of the fuel cell system. To meet this requirement, various control methods may be employed. It is to be noted that the phrase "the O/C ratio exceeds the appropriate range for the steady operating mode of the fuel cell system" means that the O/C ratio exceeds the maximum value in the appropriate range of the O/C ratio for the steady operating mode of the fuel cell system. In order to achieve efficient carbon removal, the O/C ratio is preferably set to be about 1.2 times or more the appropriate value for the steady operating mode, and is more preferably set to be about 1.5 times or more the appropriate value.

As is understood from the illustrated examples, the carbon removal process may be executed under various conditions. Namely, the carbon removal process may be performed according to the invention, by controlling at least one of the amounts of oxygen and raw fuel to be supplied under certain conditions.

Fourth Modified Example

The effect of the carbon removal process may be influenced by various parameters, including the amount of raw fuel supplied, the amount of oxygen supplied, the length of the carbon removal period, the number of execution of the carbon removal process, and so forth. In general, when the fuel cell system 60 is operated in the carbon removal mode, the carbon removal process may be executed by changing at least a part of the above-indicated parameters.

What is claimed is:

1. A fuel reforming apparatus for reforming a raw fuel containing a hydrocarbon-containing compound so as to produce a hydrogen-rich fuel gas for use in a fuel cell, comprising:

a reformer including a reforming catalyst, the reformer reforming the raw fuel by utilizing at least a steam reforming reaction and a partial oxidation reaction;

a raw fuel supply device that supplies the reformer with the raw fuel;

a water supply device that supplies the reformer with water so that at least a part of the supplied water is used for the steam reforming reaction;

an oxygen supply device that supplies the reformer with oxygen so that at least a part of the supplied oxygen is used for the partial oxidation reaction of the raw fuel at the reforming catalyst; and a controller that controls the raw fuel supply device, the water supply device and the oxygen supply device, wherein the controller executes a normal operation of the reformer and a carbon removal process for removing carbon deposited on the reforming catalyst under a predetermined condition, by controlling at least one of an amount of the raw fuel supplied to the reformer and an amount of the oxygen supplied to the reformer so that an O/C ratio of the number of oxygen atoms O supplied from the oxygen supply device to the number of carbon atoms contained in the raw fuel supplied from the raw fuel supply device becomes larger than an appropriate range of the O/C ratio that is to be established during the normal operation of the reformer, and wherein the controller selects one of a plurality of carbon removal modes that are prepared in advance, depending upon the amount of the accumulated carbon, the carbon removal process is carried out in the selected carbon removal mode.

2. A fuel reforming apparatus according to claim 1, wherein the controller calculates an amount of carbon accumulated in the reformer, based on a history of an operating condition of the reformer, and executes the carbon removal process when the amount of the accumulated carbon exceeds a predetermined threshold value.

3. A fuel reforming apparatus according to claim 1, wherein the controller executes the carbon removal process by controlling the amount of the oxygen supplied to the reformer to be larger than a predetermined amount thereof that is set for the normal operation of the reformer.

4. A fuel reforming apparatus according to claim 1, wherein the controller intermittently executes the carbon removal process a plurality of times.

5. A fuel reforming apparatus according to claim 4, wherein the controller calculates an amount of carbon accumulated in the reformer, based on a history of an operating condition of the reformer, and executes the carbon removal process when the amount of the accumulated carbon exceeds a predetermined threshold value.

6. A fuel reforming apparatus according to claim 4, wherein the controller executes the carbon removal process by controlling the amount of the oxygen supplied to the reformer to be larger than a predetermined amount thereof that is set for the normal operation of the reformer.

\* \* \* \* \*